United States Patent
Sui et al.

(10) Patent No.: US 12,304,661 B2
(45) Date of Patent: May 20, 2025

(54) SELF-POSITIONING ASSEMBLY SYSTEM FOR RAPID ASSEMBLY OF AIRCRAFT AND METHOD THEREOF

(71) Applicant: CHENGDU AIRCRAFT INDUSTRIAL (GROUP) CO., LTD., Chengdu (CN)

(72) Inventors: Shaochun Sui, Chengdu (CN); Hua Rao, Chengdu (CN); Ying Zhao, Chengdu (CN); Xiuwen Bi, Chengdu (CN); Zhenbo Deng, Chengdu (CN); Shaojie Li, Chengdu (CN); Shimao You, Chengdu (CN); Ming Wang, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 114 days.

(21) Appl. No.: 18/450,523

(22) Filed: Aug. 16, 2023

(65) Prior Publication Data
US 2023/0391474 A1 Dec. 7, 2023

Related U.S. Application Data

(63) Continuation of application No. PCT/CN2021/132603, filed on Nov. 24, 2021.

(30) Foreign Application Priority Data
Jul. 16, 2021 (CN) .......................... 202110803352.0

(51) Int. Cl.
*B64F 5/10* (2017.01)
*B23Q 1/03* (2006.01)
*B25B 11/02* (2006.01)

(52) U.S. Cl.
CPC ............... *B64F 5/10* (2017.01); *B23Q 1/037* (2013.01); *B23Q 1/035* (2013.01); *B25B 11/02* (2013.01)

(58) Field of Classification Search
CPC .......... B64F 5/10; B64F 5/50; B23P 2700/01; B23P 19/00; B23Q 1/035; B23Q 1/037; B25B 11/02; Y10T 29/50
(Continued)

(56) References Cited

U.S. PATENT DOCUMENTS 5,163,793 A * 11/1992 Martinez ................ B23Q 1/037
409/219
5,374,799 A * 12/1994 Nishimoto ............. B62D 65/02
228/6.1
(Continued)

FOREIGN PATENT DOCUMENTS

| CN | 101987438 A | 3/2011 |
| CN | 102381658 A | 3/2012 |

(Continued)

OTHER PUBLICATIONS

First Office Action issued in counterpart Chinese Patent Application No. 202110803352.0, dated Aug. 19, 2021.
(Continued)

*Primary Examiner* — Mahdi H Nejad
(74) *Attorney, Agent, or Firm* — Westbridge IP LLC

(57) ABSTRACT

Disclosed are a self-positioning assembly system for rapid assembly of an aircraft and a method thereof. The self-positioning assembly system includes a mounting platform, a framework assembly, a hole positioner assembly, a strut positioner assembly and a pallet assembly. The framework assembly is mounted on the mounting platform and includes a hole positioner column and a pallet column, the hole positioner assembly is arranged on the hole positioner (Continued)

column, the pallet assembly is arranged on the pallet column, a plurality of the hole positioner columns are respectively arranged on both sides of the mounting platform, and a plurality of the pallet columns are arranged in a middle of the mounting platform.

18 Claims, 25 Drawing Sheets

(58) Field of Classification Search
USPC ............................ 269/58, 55; 29/559, 281.5
See application file for complete search history.

(56) References Cited

U.S. PATENT DOCUMENTS

| | | | | |
|---|---|---|---|---|
| 5,829,151 | A * | 11/1998 | Collier .................... | B23Q 7/14 |
| | | | | 33/549 |
| 6,293,454 | B1 * | 9/2001 | Zhang .................. | B23K 37/047 |
| | | | | 219/80 |
| 9,022,372 | B2 * | 5/2015 | Yeum ..................... | B25B 11/02 |
| | | | | 269/58 |
| 2011/0054694 | A1 * | 3/2011 | Munk ..................... | B25B 11/02 |
| | | | | 700/275 |
| 2014/0015186 | A1 * | 1/2014 | Wessel ................. | B23Q 17/005 |
| | | | | 269/95 |
| 2015/0013162 | A1 * | 1/2015 | Best .......................... | B64F 5/50 |
| | | | | 248/122.1 |
| 2015/0314889 | A1 * | 11/2015 | Day .......................... | B64F 5/10 |
| | | | | 408/69 |
| 2015/0314892 | A1 * | 11/2015 | DesJardien ............... | B64F 5/10 |
| | | | | 29/559 |
| 2017/0157725 | A1 * | 6/2017 | Stone ....................... | B64F 5/40 |
| 2018/0056511 | A1 | 3/2018 | Ayyagari et al. | |
| 2019/0314940 | A1 * | 10/2019 | Kirby .................... | B25B 11/005 |
| 2020/0223559 | A1 * | 7/2020 | Oberst .................... | B23Q 1/28 |
| 2020/0308988 | A1 * | 10/2020 | Troop ....................... | F02C 7/20 |

FOREIGN PATENT DOCUMENTS

| | | | | |
|---|---|---|---|---|
| CN | 102745338 | A | 10/2012 | |
| CN | 103158890 | A | 6/2013 | |
| CN | 103252739 | A | 8/2013 | |
| CN | 103878580 | A | 6/2014 | |
| CN | 104128787 | A | 11/2014 | |
| CN | 104465065 | A | 3/2015 | |
| CN | 204221333 | U | 3/2015 | |
| CN | 106425359 | A | 2/2017 | |
| CN | 108340143 | A | 7/2018 | |
| CN | 109319165 | A | 2/2019 | |
| CN | 109877744 | A * | 6/2019 | |
| CN | 212290380 | U | 1/2021 | |
| CN | 112570987 | A * | 3/2021 | ............ B23P 15/00 |
| CN | 212735698 | U * | 3/2021 | |
| CN | 113245813 | A | 8/2021 | |
| CN | 216735757 | U * | 6/2022 | |
| RU | 1401780 | A1 | 1/1994 | |
| WO | WO-9851444 | A1 * | 11/1998 | ........... B23P 21/004 |

OTHER PUBLICATIONS

Grant Notification issued in counterpart Chinese Patent Application No. 202110803352.0, dated Sep. 1, 2021.
International Search Report and Written Opinion issued in corresponding PCT Application No. PCT/CN2021/132603, dated Apr. 13, 2022.

* cited by examiner

```
┌─────────────────────────────────────────────────────────────┐
│ hosting the main frame of the fuselage and placing the main frame of │
│ the fuselage on the fuselage assembly fixture, supporting the bottom │
│ of the main frame by the pallet assembly and positioning the bottom │
│ of the main frame by the hole positioner assembly, so that the slide │
│ rail support drives the hole positioner to slide to the position to be │
│ positioned, tightening the positioning threaded pin, locking the │
│ locking threaded pin; and using the intersection point hole positioner │
│ to perform intersection point hole positioning on the frame structure │
│ with the intersection point joint │
└─────────────────────────────────────────────────────────────┘ — S11
                              │
                              ▼
┌─────────────────────────────────────────────────────────────┐
│ hoisting the secondary frame of the fuselage and placing the │
│ secondary frame of the fuselage on the pallet assembly, and │
│ performing the self-positioning assembly on the secondary frame of │
│ the fuselage and the main frame of the fuselage by the strut │
│ positioner assembly │
└─────────────────────────────────────────────────────────────┘ — S12
                              │
                              ▼
┌─────────────────────────────────────────────────────────────┐
│ hoisting the main beam of the fuselage and placing the main beam of │
│ the fuselage on the fuselage assembly fixture, positioning the main │
│ beam of the fuselage by the hole positioner, and connecting and │
│ assembling the main beam of the fuselage with the main frame of the │
│ fuselage │
└─────────────────────────────────────────────────────────────┘ — S13
                              │
                              ▼
┌─────────────────────────────────────────────────────────────┐
│ hoisting the rotating top and placing the rotating top on the special │
│ positioning assembly for the rotating top support, and the rotating │
│ top hole positioner performs hole positioning for the rotating top │
└─────────────────────────────────────────────────────────────┘ — S14
                              │
                              ▼
┌─────────────────────────────────────────────────────────────┐
│ for the non-frame parts of the fuselage that have relative position │
│ requirements, using the parts tooling positioning assembly to │
│ perform positioning │
└─────────────────────────────────────────────────────────────┘ — S15
                              │
                              ▼
┌─────────────────────────────────────────────────────────────┐
│ by using the main frame and the main beam that have been │
│ positioned by the tooling as the positioning references, positioning │
│ and assembling through the structural contours and self-positioning │
│ holes of the rest of the aircraft part products │
└─────────────────────────────────────────────────────────────┘ — S16
```

FIG. 18

SELF-POSITIONING ASSEMBLY SYSTEM FOR RAPID ASSEMBLY OF AIRCRAFT AND METHOD THEREOF

CROSS-REFERENCE TO RELATED APPLICATIONS

This application is a continuation application of International Application No. PCT/CN2021/132603, filed on Nov. 24, 2021, which claims priority to Chinese Patent Application No. 202110803352.0, filed on Jul. 16, 2021. The disclosures of the above-mentioned applications are incorporated herein by reference in their entireties.

TECHNICAL FIELD

The present application relates to the technical field of aircraft assembly, in particular, to a self-positioning assembly system for rapid assembly of an aircraft and a method thereof.

BACKGROUND

Aircraft assembly has strict process requirements. The assembly parts used with positioning requirements are referred to as positioning assembly devices or positioning tooling devices, and their main purpose is to ensure the precise positioning and mounting of various parts of the aircraft, coordinate the positional relationships between various parts, improve aircraft production efficiency, and reduce costs. Due to the weak rigidity, large quantity and complex coordination relationship of aircraft parts, aircraft assembly is different from general mechanical product assembly. It is necessary to use special assembly fixture to shape and position aircraft parts. Due to the presence of a large number of assembly fixtures, the production preparation cycle of the aircraft is long, the manufacturing cost is high, and the working environment for workers in the aircraft assembly process is not friendly enough.

In the traditional aircraft assembly tooling, a large number of trussed welded framework are used, and the positioner and the framework are fixedly connected. The assembly of one type of aircraft product often requires hundreds of sets of assembly fixtures, and the assembly fixtures are only designed for one type of aircraft and cannot be reused for the other aircraft type. As a result, fixture resources are idle and wasted in large quantities. The assembly method of the traditional aircraft fuselage structure is to shape and position the aircraft fuselage parts of more than 90% by the fuselage assembly fixture. Most parts in the fuselage structure need the fixture positioning assembly, and the assembly amount is large. Therefore, the traditional assembly fixture is usually special, with low reuse rate and complex structure; as a result, there is an urgent need to design a positioning device that is convenient to use, fast to mount, accurate, and easy to operate in the field of aircraft assembly.

In addition, aircraft assembly generally uses aircraft assembly fixture to realize aircraft assembly. However, the fixtures take up a lot of space. The fixture is special process equipment in traditional aircraft assembly, is an important component of assembly tooling, and has a characteristics of closely related to aircraft structure. Therefore, traditional assembly fixture is generally difficult to adapt to the assembly of different aircraft types. Whether the structural design of the assembly fixture is reasonable and correct not only has a direct impact on the manufacturing workload, cycle length, costs, and assembly conditions of the assembly fixture itself, but also determines whether the docking and matching dimensions of each workpiece are consistent, which affects the interchange coordination, manufacturing quality and progress of aircraft assembly, and affects the entire manufacturing cycle of aircraft.

To this end, how to fully consider the different requirements of different types of aircraft assembly, improve the assembly quality and efficiency of the aircraft, shorten the assembly cycle, how to achieve accurate self-positioning in the aircraft assembly process, realize assembly with fewer fixtures, and improve site utilization to improve production efficiency, has become an urgent technical problem in the field of aircraft assembly technology.

SUMMARY

The purpose of the present application is to provide a self-positioning assembly system for rapid assembly of an aircraft and a method thereof. The overall framework of the aircraft assembly tooling adopts a dispersed column assembly method, and various positioners are adopted to perform self-positioning on the aircraft parts to realize the fixture-free and self-positioning assembly of the aircraft, achieving the technical effects of saving space and site, simplifying the tooling structure, improving the efficiency and quality of aircraft assembly and reducing the cost of aircraft assembly.

To achieve the above object, the present application provides a self-positioning assembly system for rapid assembly of an aircraft, including a mounting platform, a framework assembly, a hole positioner assembly, a strut positioner assembly and a pallet assembly, and can further include any one or more of an intersection point hole positioner, a special positioning assembly for a rotating top support and a parts tooling positioning assembly that perform positioning for some special parts or key parts of an aircraft.

The mounting platform is mounted on the foundation and is connected to the framework assembly. The framework assembly includes a hole positioner column on which the hole positioner assembly and/or an intersection point hole positioner are arranged, and a pallet column on which the pallet assembly is arranged. The hole positioner assembly, the intersection point hole positioner and the pallet assembly are all modular and reconfigurable positioner structures, and can improve the openness and the reuse rate of the tooling.

The mounting platform includes a mounting substrate and a mounting base. AT-shaped notch is formed between adjacent mounting substrates and the mounting base, and a plurality of T-shaped notches which are intersected vertically and horizontally are formed on the surface of the mounting platform. The T-shaped notch is configured to mount the framework assembly base to provide a supporting platform for assembling the framework assembly; the main body form of the framework assembly breaks through the closed frame and beam structure type of the traditional tooling framework, and the structural layout in the form of the column group is adopted, so that the openness of the tooling is improved, and the tooling is concise and convenient to assemble. In the positioner and the positioner assembly, except that the special positioning assembly for the rotating top support is the special positioner for the circular product of the aircraft, other positioners and positioner assemblies are all universal structures of self-locating tooling. The positioning of products can be achieved by the above-mentioned several universal positioners and positioner assemblies in the positioning of the main frame and the main beam of different aircraft models.

A hoisting hole is provided at the center of the mounting substrate and is configured to be connected with a hook of hoisting equipment such as a gantry crane. The hoisting hole is arranged at the center of the mounting substrate, and unsafe accidents caused by the fact that the mounting substrate inclines can be effectively prevented.

The hole positioner column includes a first vertical tubular column, a first connecting plate, a first base and a mounting plate, wherein the mounting plate is connected to the base by a connecting bolt, the base is connected to the first vertical tubular column, the outer surface of the first vertical tubular column is connected to the first connecting plate, and the first connecting plate is provided with a plurality of standard mounting holes. The mounting hole is standardized to form a standard mounting hole, which is beneficial for different assemblies to be connected on the connecting plate. The hole positioner assembly and the intersection point hole positioner can be mounted on the standard mounting hole, and the height of the hole positioner assembly and the intersection point hole positioner can adjusted. A section of the first vertical tubular column may be square or rectangular. The hole positioner column is mainly used for adjusting the height of the hole positioner assembly and the intersection point hole positioner.

The bottom of the first vertical tubular column is further connected to a plurality of first rib plates, the bottoms of the plurality of first rib plates are connected to the first base, and the first rib plates are used for strengthening the connection strength between the first vertical tubular column and the first base.

The pallet positioner column includes a second vertical tubular column, a second connecting plate, a second base and a mounting plate, wherein the mounting plate is connected to the second base by a connecting bolt, the second base is connected to the second vertical tubular column, the outer surface of the second vertical tubular column is connected to the second connecting plate, and the second connecting plate is provided with a plurality of standard mounting holes. The mounting hole is standardized to form a standard mounting hole, which is beneficial for different assemblies to be connected on the connecting plate. Wherein the second vertical tubular column may adopt any one or more of a square-section pipe and a rectangular-section pipe.

The bottom of the second vertical tubular column is also connected with a plurality of second rib plates, the bottoms of the plurality of second rib plates are connected to a second base, and the second rib plates are used for strengthening the connection strength between the second vertical tubular column and the second base.

The top of the first/second vertical tubular column is provided with a hoisting device for hoisting operations when the first/second vertical tubular column needs to be moved.

The hole positioner assembly includes a hole positioner, a slide rail support and a positioning pin assembly, the slide rail support is mounted on the hole positioner column by a screw and the positioning pin assembly, the end of the slide rail support is connected to the hole positioner and/or the intersection point hole positioner, and the hole positioner assembly is used to perform positioning for the hole and/or the intersection point hole of the aircraft tooling.

The slide rail support includes a base plate, a support body, a guide rail assembly, a stop block and a handle. The support body is slidably connected to the guide rail assembly, and both ends of the guide rail assembly are provided with stop blocks respectively. The stop blocks are used to limit the support body, one end of the support body is connected to the handle, and the handle is beneficial for workers to push and pull the support body and adjust the horizontal displacement of the support body. The hole positioner and/or the intersection point hole positioner are driven by the support body to horizontally slide, and specifications of the slide rail can be changed at any time according to the requirements of space and stroke, with strong reconfigurability.

The positioning pin assembly is a spiral-shaped positioning pin assembly and includes an insert pin, a channel bushing, a cylindrical pin and a bushing, the channel bushing has a spiral track groove in a spiral shape, the channel bushing is fixed to the slide rail support, the bushing is fixed to the base plate, the lower part of the insert pin is connected to the bushing, and the cylindrical pin is arranged in the middle of the insert pin. The cylindrical pin is used to limit the insert pin, so that the insert pin moves along the spiral track of the spiral bushing during the inserting and pulling process. The spiral track groove is conducive to the sliding of the cylindrical pin in the spiral track groove, and the positioning pin assembly can be adjusted to be positioned at any point in the length direction of the spiral track groove, while preventing the pin from sliding out or falling.

In an embodiment, the positioning pin assembly can also be a Z-shaped positioning pin assembly and includes an insert pin, a channel bushing, a cylindrical pin and a bushing. The channel bushing has a track groove in a Z-shaped, the channel bushing is fixed to the slide rail support, the bushing is fixed to the base plate, the lower part of the insert pin is connected to the bushing, the cylindrical pin is arranged in the middle of the insert pin and is used for limiting, and the insert pin can slide along the Z-shaped track groove. Compared to the spiral-shaped positioning pin assembly, the Z-shaped positioning pin assembly can realize the rapid installation and removal of all parts of the positioning pin assembly, which effectively solves the problem of on-site management difficulties caused by the need for pin positioning at multiple locations during aircraft assembly, avoids the occurrence of parts tooling, and improves the overall efficiency of tooling. Compared to other positioning pin assembly, the Z-shaped positioning pin assembly can realize the rapid installation and removal of all parts of the positioning pin assembly, which effectively solves the problem of on-site management difficulties caused by the need for pin positioning at multiple locations during aircraft assembly, avoids the occurrence of parts tooling, and improves the overall efficiency of tooling.

The hole positioner is mainly used to perform positioning for a positioning hole of a main frame or a main beam of an aircraft and includes a positioner joint, a positioning threaded pin, a handle nut, a positioning insert pin and a locking threaded pin. The positioner joint has an L-shaped cross section and has two surfaces connected vertically to each other. One side of the positioner joint is provided with a central positioning hole, and the other side is provided with a plurality of oblong holes and a plurality of positioning circular holes. The positioning threaded pin is mounted in the central positioning hole and is in contact with the surface to be positioned of the aircraft product. The locking threaded pin is mounted in the oblong hole, and the positioning insert pin is inserted into the positioning circular hole. The locking threaded pin and the positioning insert pin are used to lock the positioning position after the positioning threaded pin contacts the surface to be position of product. The positioning surface of the hole positioner joint is bonded to the product surface, the locking threaded pin passes through the bottom surface of the positioner joint, is screwed to the slide rail support and is compressed, and positioning is performed by the positioning insert pin. When the hole positioner exits, the positioning insert pin is pulled out, the locking threaded pin is loosened, and the positioner joint is slidable along the oblong hole, so that the working position is moved out.

The strut positioner assembly is used independently and does not depend on supporting components such as the hole positioner column, the pallet column and the like. The strut positioner assembly is mainly used to perform positioning for the relative positions between a plurality of frames of an aircraft body, which mainly depends on the positioning surface of the product, therefore the strut positioner assembly belongs to a typical positioner that can achieve self-positioning.

In an embodiment, the strut positioner assembly is a slidable strut positioner assembly that can achieve fine adjustment, and includes an abutting nut, a positioning sleeve, a pressing block insert pin, a pointer, a locking nut, a strut, a cylinder insert pin and an end pin. The end pin is a structure in which a smooth rod is at one end and a threaded rod is at the other end. One end of the end pin is inserted into one end of the strut, and the end pin and the strut are fixed by the cylindrical insert pin. The other end of the strut is sleeved into the positioning sleeve, and the positioning sleeve is provided with wedge-shaped grooves on both sides along the axial direction. The wedge-shaped grooves are strip-shaped slot holes with trapezoidal section arranged the length direction of the positioning sleeve. The pressing block insert pin can be inserted into the wedge-shaped groove on one side. The pressing block insert pin is T-shaped structure and is composed of the pressing block and the threaded insert pin arranged perpendicular to the pressing block. The locking nut is connected to the external thread of the threaded insert pin of the pressing block insert pin. By tightening the locking nut, the pressing block insert pin and the wedge-shaped groove of the positioning sleeve can be compressed, and the relative position of the positioning sleeve and the strut can be fixed.

A pointer is arranged on the pressing block insert pin, a scale is arranged on the outer surface of the positioning sleeve, and the pointer is used to indicate the scale. Usually, a plurality of strut positioner assemblies are usually arranged between the positioning surfaces of two aircraft parts (such as two main frames), and it is necessary to ensure that the vertical distances between the points of the two positioning surfaces are equal. Therefore, when the installer locates and installs, he can determine whether the scales on each strut positioner assembly are consistent by reading the scales on each strut positioner assembly respectively. If the scales are consistent, it indicates that the two positioning surfaces are parallel, and if not, the extension length of the strut positioner assembly needs to be adjusted.

The strut positioner assembly is a fixed strut positioner assembly that can realize fine adjustment. The strut positioner assembly includes an abutting nut, a positioning sleeve, a strut, a cylinder insert pin, an end pin and T-shaped insert pin. The end pin is a structure in which both ends are threaded rods, one end of the end pin is screwed to one end of the strut, and the end pin and the strut are fixed by a cylindrical insert pin. The other end of the strut is sleeved into the positioning sleeve, and one end of the positioning sleeve is screwed to the abutting nut. The T-shaped insert pin is composed of a handle and a rod positioning insert pin. The rod positioning insert pin can be inserted into the perforation of the positioning sleeve and the perforation of the strut. The middle part of the rod positioning insert pin is provided with a tether perforation. After the T-shaped insert pin is inserted into the positioning sleeve, a high-strength binding strap such as a steel wire rope is passed through the tether perforation to bind and fix the T-shaped insert pin.

The intersection point hole positioner is used to perform positioning for the main frame with the wing-body connection joint or the intersection point of the wing-body. The intersection point hole positioner includes a mounting base, an intersection point hole positioning support, an insert pin, a positioning lug and a compression nut. The mounting base is fixed to the hole positioner column, and the mounting base is connected to the intersection point hole positioning support by a bolt. The intersection point hole positioning support is formed by vertical welding of a base and two mutual parallel support seats, each of the support seats is provided with a plurality of perforations, and the multiple rows of perforations on the two support seats are parallel to each other. A plurality of the insert pins pass through perforations on one support seat respectively, then pass through two positioning lugs respectively, and pass through the plurality of perforations on the other support seat respectively. One end of each insert pin is provided with a compression nut, thereby preventing the insert pin from slipping and being lost during use. The intersection point joint is the key positioning point, and the intersection point positioner is used to perform positioning for the main frame with wing body connection joints, such main frame will serve as the reference frame for the subsequent self-positioning of frame components.

The pallet assembly is used to support the main frame or main beam structure of the aircraft and position the holes. The pallet assembly includes a support, a supporting plate, a gasket, a threaded pin, a positioning pin and a hole positioner. The support is fixed to the hoisting plate at the top of the pallet column. The cross section of the support is an L-shaped structure, and one side of the support is connected to the pallet by a plurality of threaded pins and positioning pins. The pallet is a plate-shaped component, a plurality of gaskets are embedded on the top of the pallet, and a hole positioner is fixedly connected to one side of the pallet. The pallet assembly is used to support the main frame structure of the aircraft and position the holes. The surface of the pallet is the product skin shape, which can meet the supporting function under two working conditions: when the skin is not connected, the gasket is added, and the positioning is performed for the profile of the frame shape; after the skin is connected, the gasket is taken out, and the shape of the skin is supported.

The special positioning assembly for the rotating top support is used to support and position the circular product of the aircraft, and the special positioning assembly for the rotating top support includes a framework, a positioner support, an auxiliary strut and a positioner. The special positioning assembly of the rotary top support adopts a point distribution structure, and adopts a multi-point positioning for the overall circular product; multiple sets of positioners are connected to the positioner support by bolts, are distributed at four points in space, and perform positioning and pressing for the outer surface of the product, thereby avoiding problems such as the difficulty of integral positioning processing and insufficient open space; one end of the auxiliary support is connected to the positioner support, the other end is connected to the framework, and both ends adopt fork-ear rotating structure, which can realize different angles of connection. Auxiliary support is provided to the positioner support to enhance the connection rigidity and improve the stability.

The parts tooling positioning assembly is used to perform positioning for the relative position of the non-frame parts.

The parts tooling positioning assembly includes a parts tooling body and a large-small head insert pin. The parts tooling body is a rectangular shape structure, with positioning holes arranged at four corners, and a plurality of large-small head insert pins are inserted into the positioning holes respectively, and are connected to the holes to be positioned arranged on the parts product. There is a ring gasket sandwiched between the hole to be positioned/positioning hole and the large-small head insert pins. The parts tooling positioning assembly is mainly used to perform positioning for aircraft structural components that do not have high requirements for parts of product but have high requirements for relative position between two products.

It should be emphasized that although both the parts tooling positioning assembly and the strut positioner assembly are used for positioning of the relative position, the parts tooling positioning assembly is mainly used to perform positioning for the relative positions of non-frame parts, while the strut positioner assembly is mainly used to perform positioning for the relative positions of frame parts (such as main frame and main beam).

In the fuselage assembly tooling, the most important thing is the positioning of frame parts. Generally speaking, the frame of a product (including the main frame and the secondary frame of the fuselage) is positioned by four hole positioners, that is, the "four-point positioning" method can achieve complete positioning. By the compression of circular holes, oblong holes and nuts, that is, the degree of freedom of a frame part has been theoretically completely limited. However, since the frame parts of aircraft products are generally large, the positioning rigidity of 2-point positioning is generally weak. Therefore, the general frame parts adopt 4-point positioning method, and the remaining 2 points are only used for compression; according to the actual product structure, larger-sized frame structures even adopt 6-point or 8-point positioning to improve the stability of frame positioning.

An assembly method based on a self-positioning assembly system for rapid assembly of an aircraft, used for the above-mentioned aircraft fuselage tooling positioning device based on self-positioning assembly, wherein the tooling method includes the following steps:

step S0: analyzing the overall structural characteristics of the aircraft, striping out key control points, and connecting a fuselage assembly fixture 72 and a wing assembly fixture 73 to a mounting platform 1 according to positions of the mounting platform 1 and a framework assembly corresponding to the key control points;

step S1: using the fuselage assembly fixture 72 to perform the self-positioning assembly of the fuselage parts;

step S2: using the wing assembly fixture 73 to perform self-positioning assembly of the wing parts;

step S3: on the basis of the completion of steps S1 and S2, enabling the fuselage fixture to match with the wing attitude adjustment frame, and the wing body is finished and reamed;

step S4: on the basis of the completion of step S3, performing the self-positioning assembly for the accessory parts of the aircraft, finally the aircraft framework is formed by assembly, and performing the skin riveting for the aircraft framework.

By adopting the above-mentioned dispersed column assembly method, the traditional closed frame structure assembly has been changed. Positioning and assembling are performed for the main frame and beam structures, and the self-positioning tooling structure is designed to maximize the openness of the assembly tooling. At the same time, the framework adopts standardized column structure, standardized interface form, overall detachable and reconstruction, which greatly shortens the assembly cycle and improves the reuse rate of tooling.

To sum up, compared to traditional fixture positioning device and tooling method, an assembly method based on a self-positioning assembly system for rapid assembly of an aircraft of the present application has the advantages of:

1) The framework assembly of the present application adopts a dispersed column group assembly method, which saves assembly space to the greatest extent, adopts the concept of fixture-free assembly, and simplifies and decreases the tooling structure. Under the premise of large assembly space and less tooling structure, workers can flexibly move in and out of assembly space sites to implement workpiece positioning and assembly operations;

2) The present application proposes a new and more efficient hole positioner assembly, a strut positioner assembly and a special positioning assembly for the rotating top support. By rough adjustment of the dispersed column and fine adjustment of the various positioner assemblies, the self-positioning assembly and modular assembly of the aircraft can be implemented, which increases the efficiency of aircraft assembly;

3) The strut positioner assembly of the present application is provided with a scale. When a plurality of strut positioner assemblies are mounted between two positioning surfaces, the installer can read the scale to more intuitively determine whether the two positioning surfaces are parallel, and quickly adjust the extension length of the strut positioner assembly when they are not parallel;

4) The top of the vertical tubular column of the present application is provided with a hoisting component, which can be used to hoist the hole positioner column or the pallet column, thereby better assisting the installation workers in rapid installation and increasing the efficiency of aircraft assembly;

5) The aircraft tooling positioning device for self-positioning assembly of the present application can be applied to the assembly of different aircraft models, compared to the prior art in which a set of tooling positioning device is separately provided for each model, the reuse rate of the tooling is increased.

BRIEF DESCRIPTION OF THE DRAWINGS

FIG. 18 is a flowchart of the self-positioning assembling for fuselage parts according to the present application.

DETAILED DESCRIPTION OF THE EMBODIMENTS

The technical solutions of the embodiments of the present application will be clearly and completely described below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

Embodiment 1

Figure 1:
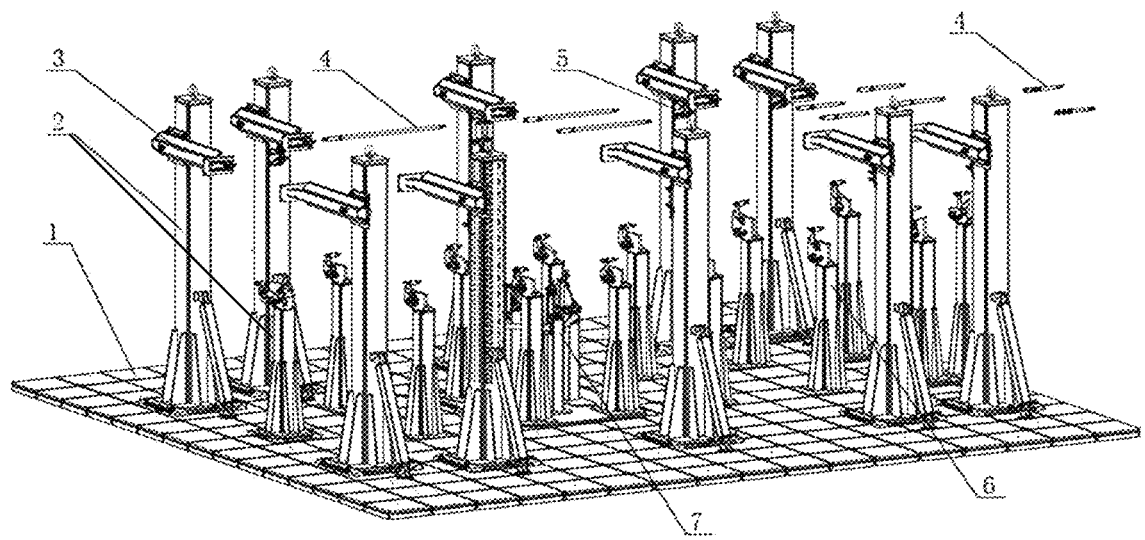
FIG. 1 is a schematic diagram of an aircraft fuselage assembly tooling system according to the present application.
Figure 2:
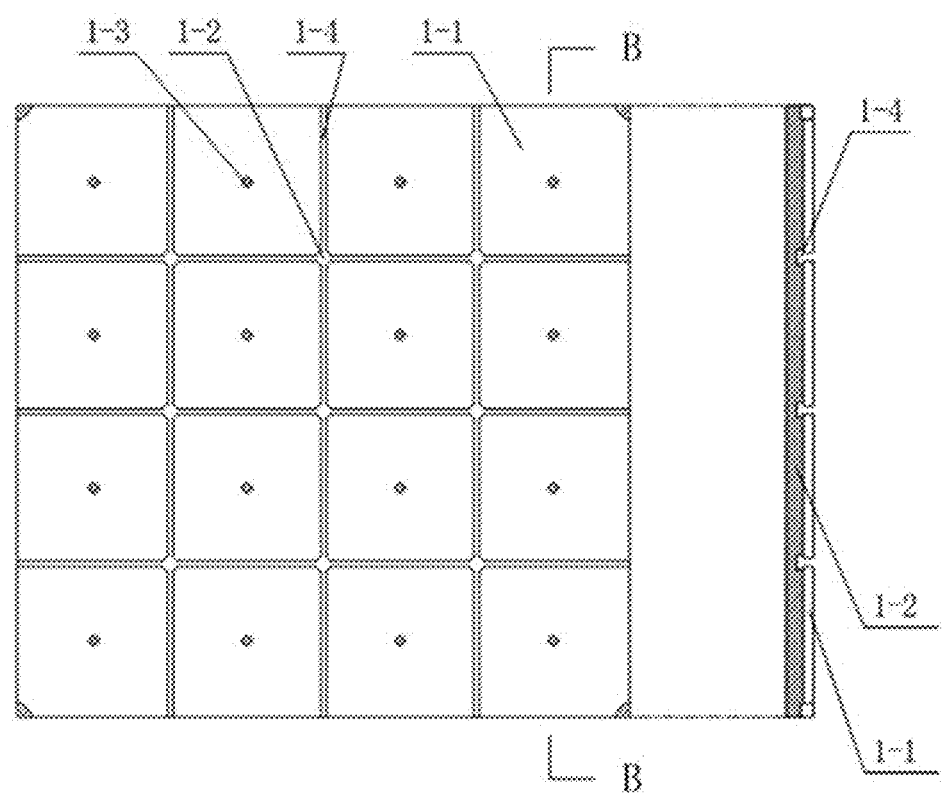
FIG. 2 is a structure diagram of a mounting platform according to the present application.
Figure 3:
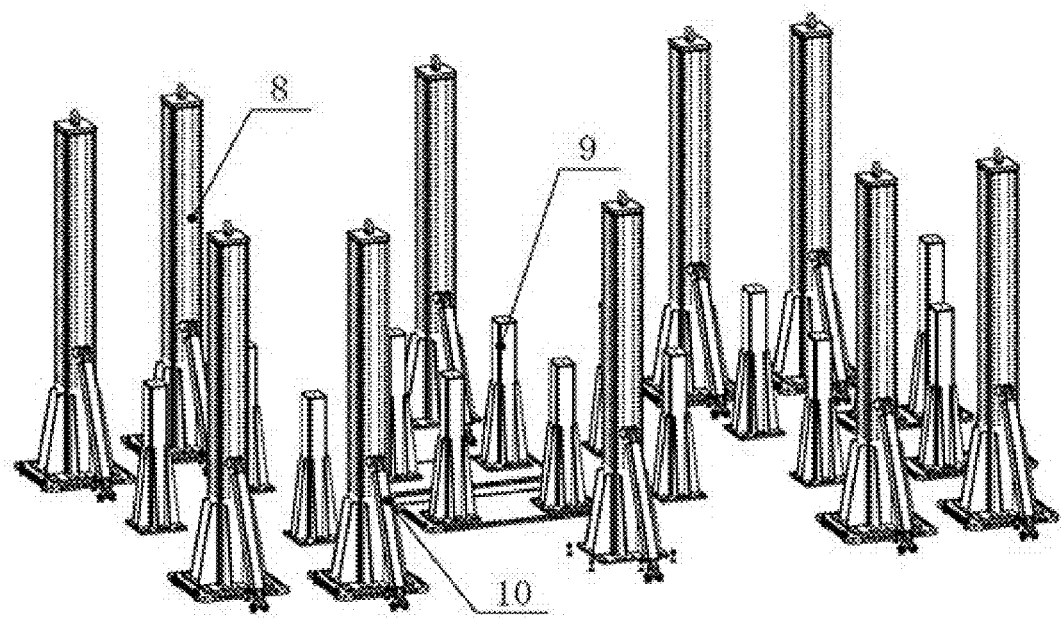
FIG. 3 is a structure diagram of a framework assembly according to the present application.

As shown in FIG. 1 to FIG. 3, a self-positioning assembly system for rapid assembly of an aircraft of the present application includes a mounting platform 1, a framework assembly 2, a hole positioner assembly 3, a strut positioner assembly 4, an intersection point hole positioner 5, pallet assembly 6, and a special positioning assembly for a rotating top support 7.

The mounting platform 1 includes a mounting substrate 1-1 and a mounting base 1-2. A plurality of mounting substrates 1-1 are arranged in an array and are connected to the mounting base 1-2. The mounting base is placed on the foundation, and two mounting substrates 1-1 adjacent to each other and the mounting base 1-2 form a T-shaped notch 1-4 that intersects vertically and horizontally. The T-shaped notch 1-4 is configured to connect the mounting plate of the framework assembly.

Due to the large mass of the mounting substrate 1-1, in the actual installation process, hoisting equipment such as a gantry crane is required for auxiliary hoisting, and workers will not be too laborious during the assembly process of the mounting platform. Therefore, a hoisting hole 1-3 is provided at the center of the mounting substrate 1-1, which is to keep the center of gravity of the mounting substrate 1-1 stable during the hoisting process, thereby preventing safety accidents such as tilting and injuring the workers due to the unstable center of gravity of the mounting substrate 1-1.

The function of the mounting platform 1 is to provide a supporting platform for the assembly of the tooling. A plurality of framework assemblies 2 are mounted on the mounting platform 1, and the framework assembly 2 is composed of a hole positioner column 8, a pallet column 9 and an auxiliary support assembly 10. The form of the framework body breaks through the closed frame beam structure type of the traditional tooling framework, and adopts a column group structure layout, thereby increasing the openness of the tooling and making it simple and easy to assemble. A plurality of hole positioner columns 8 are respectively arranged on both sides of the mounting platform 1, and are mainly used to connect the hole positioner assembly 3 and the intersection point hole positioner 5 for positioning the main frame; a plurality of pallet columns 9 are arranged in the middle of the mounting platform 1, and are configured to install the pallet assembly 6 that performs hoisting and positioning for the main frame. The purpose of this layout is also to consider the structural factors of the aircraft, that is, the middle of the aircraft body has a large volume, while both sides (wing parts), the nose and empennage are relatively small in volume. Therefore, the structural layout of the column group type is conducive to the overall assembly of the aircraft. In addition, due to the high height of the hole positioner column 8 on both sides, auxiliary support assemblies 10 are mounted on both sides of the mounting platform 1 to enhance the whole structural rigidity of the aircraft tooling positioning device.

Figure 4:
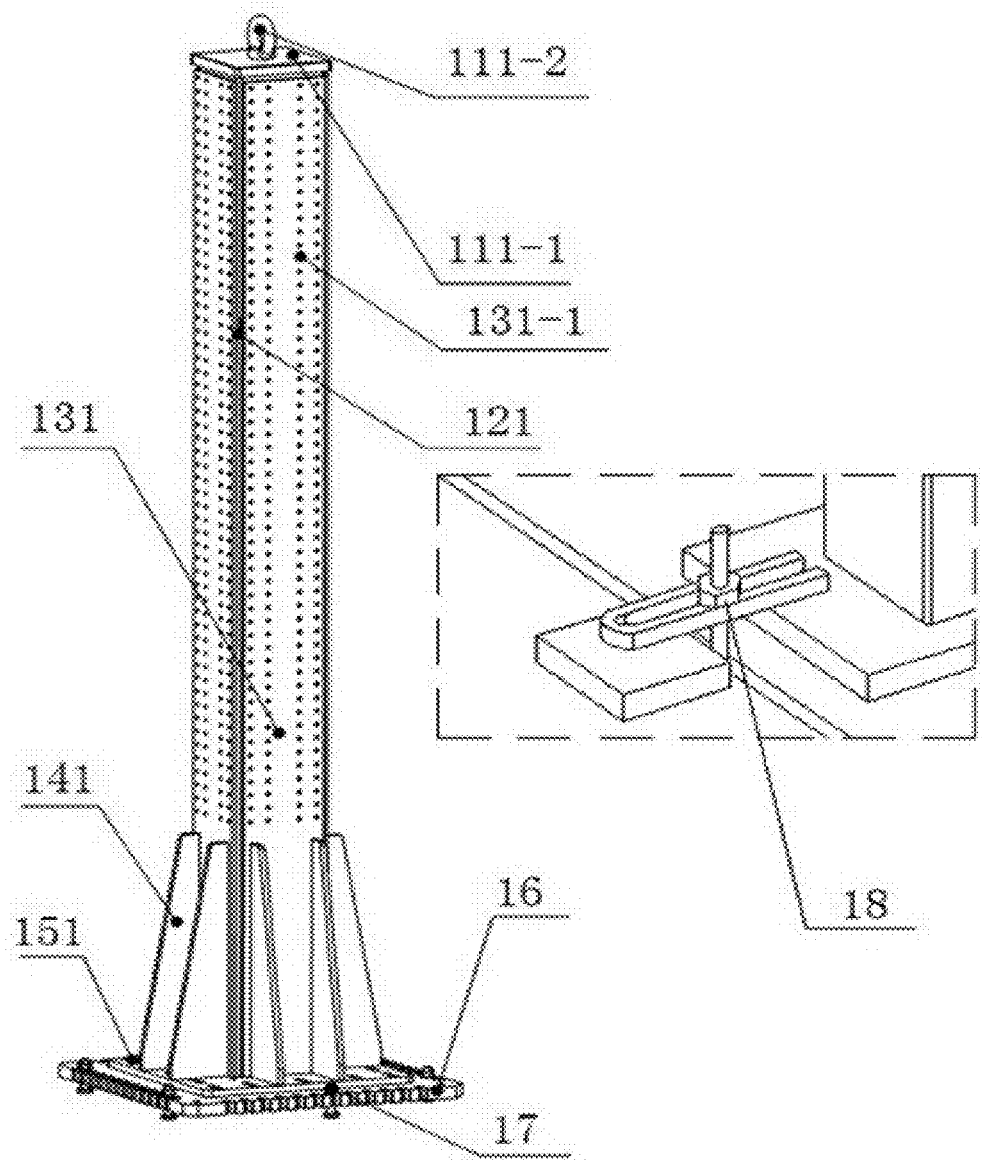
FIG. 4 is a structure diagram of a hole positioner column according to the present application.

As shown in FIG. 4, the hole positioner column 8 includes a first hoisting plate 111-1, a first vertical tubular column 121, a first connecting plate 131, a first rib plate 141, a first base 151 and a mounting plate 16, wherein four sides of the column are connected to the first connecting plate 131. The surface roughness Ra of the first connecting plate 131 is 3.2, and the first connecting plate 131 is provided with four rows of standard connecting holes 131-1 with Φ11H7, which can be used as threaded connecting holes or positioning pin holes as required. The diagonals of the connecting plate of the positioner are connected by a standard positioning pin, and the rest of the connecting holes are connected by threads, which are used to connect positioner assemblies such as hole positioner assemblies and intersection point hole positioners, so as to realize the standardization and interchangeability of the connection between the positioner assemblies and the column. In order to facilitate the hoisting of the column assembly 2 during the assembly process, the top of the first vertical tubular column 121 is closed by the first hoisting plate 111-1, the center of the first hoisting plate 111-1 is provided with a hoisting ring 111-2, and the hoisting ring 111-2 is detachable; U-shaped grooves are arranged at four sides of the mounting plate 16 for bolt connection, and the hole positioner column 8 connects the mounting plate 16 to the mounting platform 1 by the connecting bolt 17 (or pressing block bolt 18).

Figure 5:
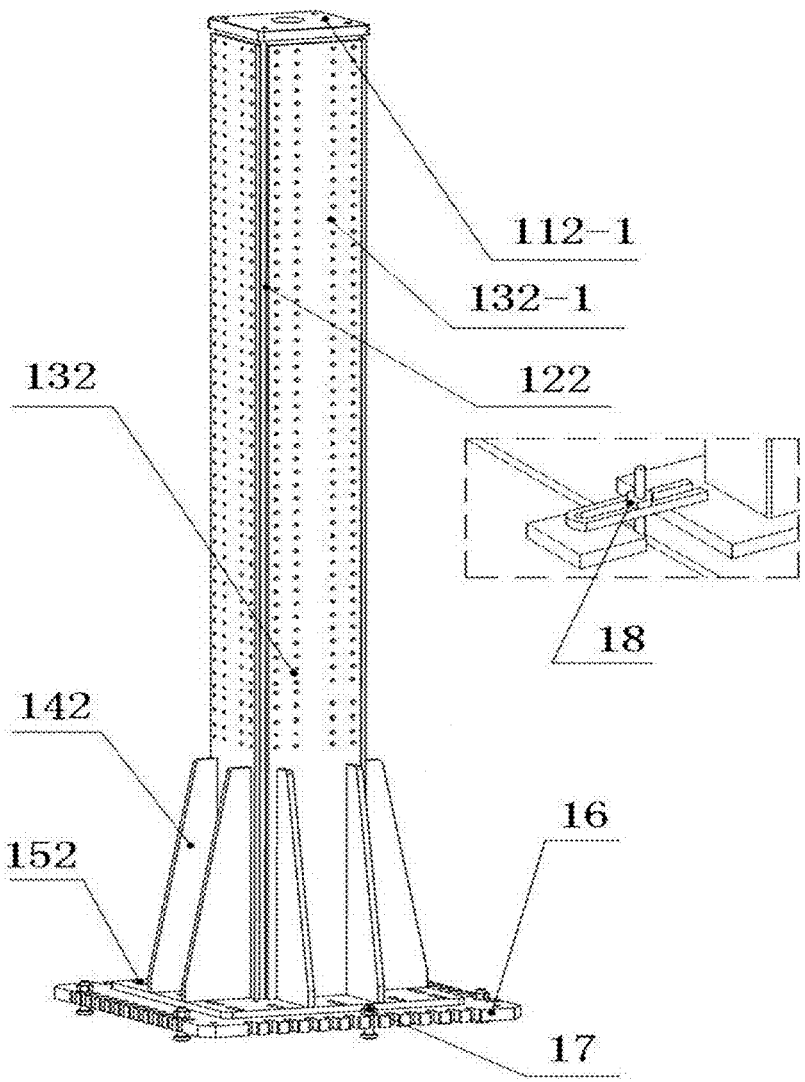
FIG. 5 is a structure diagram of a pallet column according to the present application.

As shown in FIG. 5, the pallet column 9 includes a second hoisting plate 112-1, a second vertical tubular column 122, a second connecting plate 132, a second rib plate 142, a second base 152 and a mounting plate 16. The top of the second vertical tubular column 122 is connected to the second hoisting plate 112-1, the bottom of the second vertical tubular column 122 is connected to the second base 152, and the bottom of the second vertical tubular column 122 is further provided with a second rib plate 142, at the same time, the second rib plate 142 is connected to the second base 152, and the second base 152 is connected to the mounting plate 16. The structural appearance of the pallet column 9 is the same as that of the hole positioner column 8, except that the outline size and the hoisting structure are different. The center of the surface of the second hoisting plate 112-1 of the pallet column 9 is provided with a ring hole. When the pallet column 9 is mounted, the ring hole is hung on the crane for auxiliary hoisting. Since the top of the pallet column 9 is also used to connect the pallet assembly 6, no hoisting ring is provided on the hoisting plate 112-1. After the pallet column 9 is hoisted in place, the ring holes will no longer be used in the actual assembly process of the aircraft.

Figure 6:
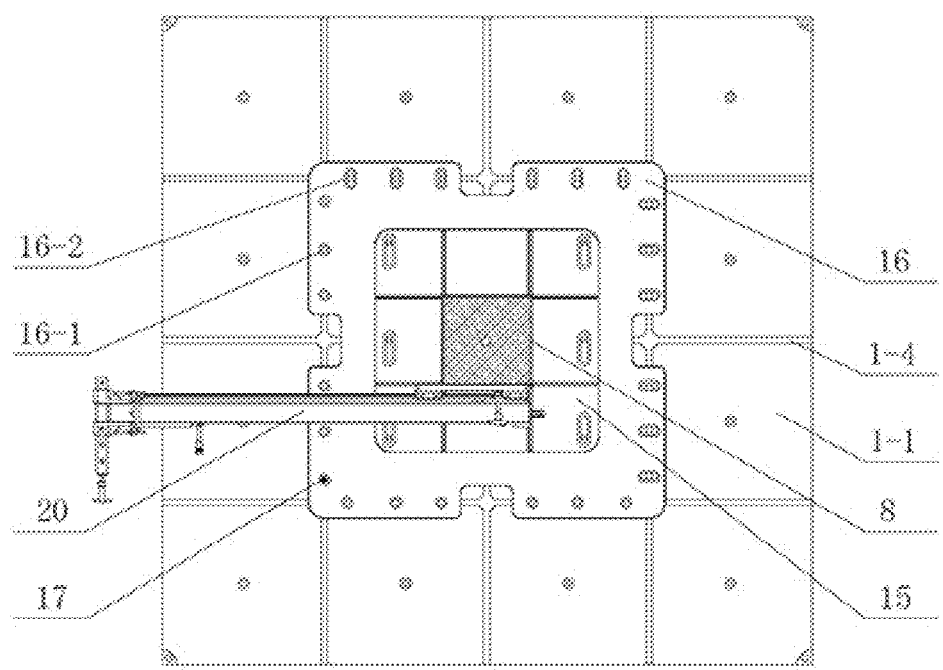
FIG. 6 is a partial top view of the connection between the hole positioner column and the mounting platform according to the present application.

As shown in FIG. 6, the hole positioner column 8 (or the pallet column 9) is connected to the base 15 (the first base 151 or the second base 152), and the base 15 is connected to the mounting plate 16, and the mounting plate 16 is in a square shape (compared to rectangular or other shaped mounting plates, square mounting plates have better reconfigurability and are easier to mount and move). The edge of the mounting plate 16 is provided with two groups of first circular holes 16-1 and two groups of first oblong holes 16-2, and each group of first circular holes 16-1 and each group of first oblong holes 16-2 are arranged to be adjacent. The connecting bolt 17 (or pressing block bolt 18) extends through the first circular hole 16-1 and the first oblong hole 16-2 into the T-shaped notch 1-4 in the mounting platform 1, and is connected to the nut placed in the T-shaped notch 1-4. The first circular hole 16-1 and the first oblong hole 16-2 facilitate the position adjustment of the mounting plate 16 in the longitudinal and transverse directions.

The existing mounting plate 16 and the mounting substrate 1-1 are usually provided with many threaded holes. When fixing the mounting plate 16 and the mounting substrate 1-1, it is usually necessary to align the threaded holes on the mounting plate 16 with the threaded holes on the mounting substrate 1-1 and then connect them by using connecting bolts 17. Whether it is the mounting plate 16 or the mounting substrate 1-1, the processing and manufacturing costs are relatively high, the connection between the two requires high accuracy, and the fixed installation takes a long time. In the present application, by fixing the mounting plate 16 in the T-shaped notches 1-4 that intersect vertically and horizontally, the need for drilling holes on the mounting plate 16 can be eliminated, reducing the processing and manufacturing costs, making the connection more stable, and achieving accurate positioning without high assembly accuracy, disassembly is more convenient.

Figure 7:
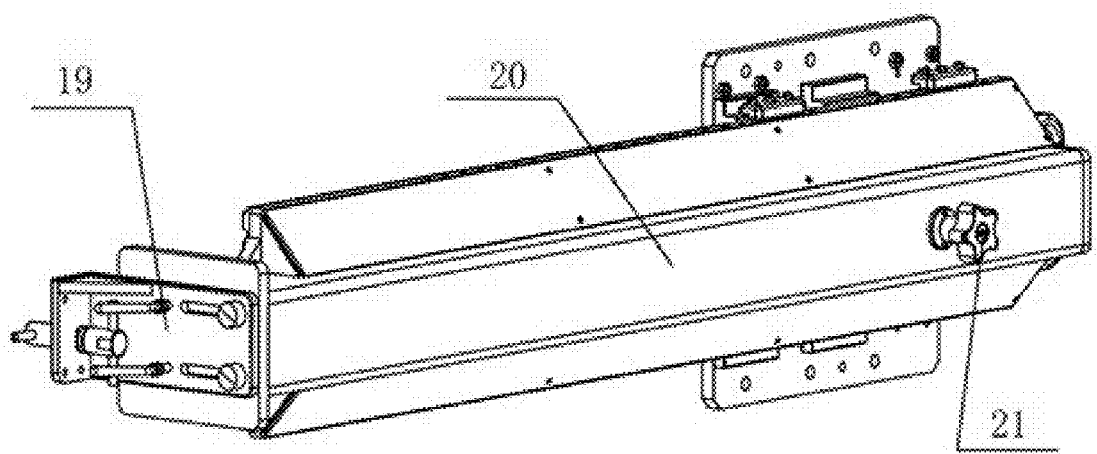
FIG. 7 is a schematic diagram of the partial connection between the hole positioner assembly and a slide rail support according to the present application.

As shown in FIG. 7, the hole positioner assembly 3 includes a hole positioner 19 (or an intersection point hole positioner 5), a slide rail support 20 and a positioning pin assembly 21. The slide rail support 20 is mounted on the hole positioner column 8 by screws and positioning pin assemblies 21, an end of the slide rail support 20 is connected to the hole positioner 19 (or the intersection point hole positioner 5), and sliding by the slide rail support 20 can drive the hole positioner 19 (or intersection point hole positioner 5) to move in the horizontal direction, that is, realizing rough adjustment of hole positioning or intersection point hole positioning.

Figure 8:
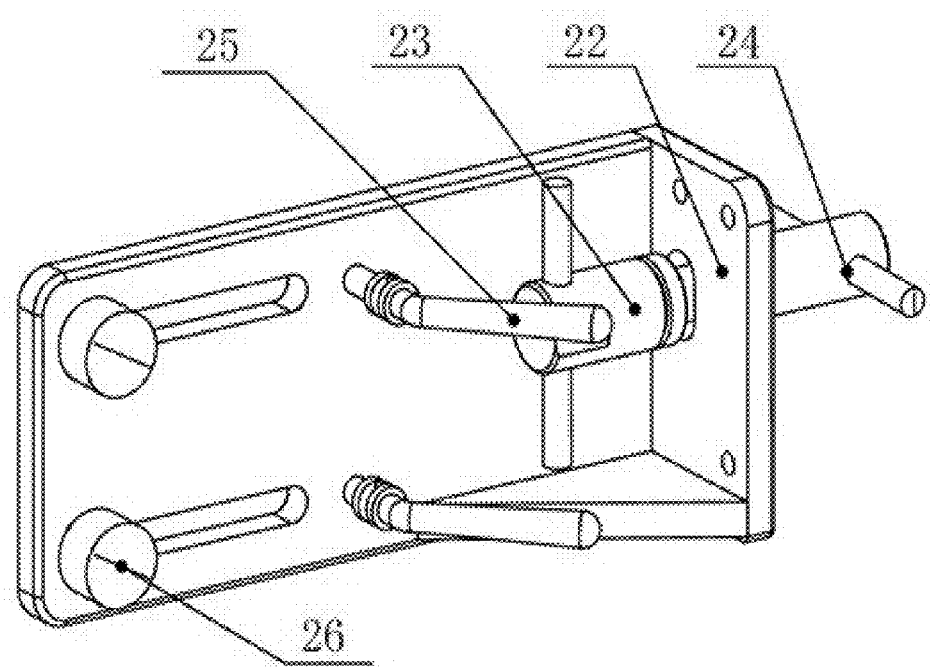
FIG. 8 is a structure diagram of the hole positioner assembly according to the present application.

As shown in FIG. 8, the hole positioner 19 includes a positioner joint 22, a positioning threaded pin 23, a handle nut 24, a positioning insert pin 25, and a locking threaded pin 26. The positioner joint 22 has an L-shaped structure and has two planes connected vertically to each other. One side of the positioner joint 22 is provided with a central positioning hole, and the other side is provided with a plurality of oblong holes and a plurality of positioning circular holes. The positioning threaded pin 23 is mounted in the central positioning hole, the locking threaded pin 26 is mounted in the oblong hole, and the positioning insert pin 25 is inserted into the positioning circular hole. The positioning surface of the positioner joint 22 is bonded to the product surface. The other end of the positioning threaded pin 23 is connected to the handle nut 24, and the positioning threaded pin 23 passes through the central positioning hole of the positioner joint 22 and the product process hole, and is then pressed by the handle nut 24, so as to realize the clamping of the product; the locking threaded pin 26 passes through the oblong hole of the positioner joint 22, is screwed to the slide rail support 20, and is positioned by the positioning insert pin 25; when it is necessary to exit the hole positioner, the positioning insert pin 25 is pulled out, and the positioner joint 22 is slidable along the oblong hole, thereby moving out of the working position.

Figure 9:
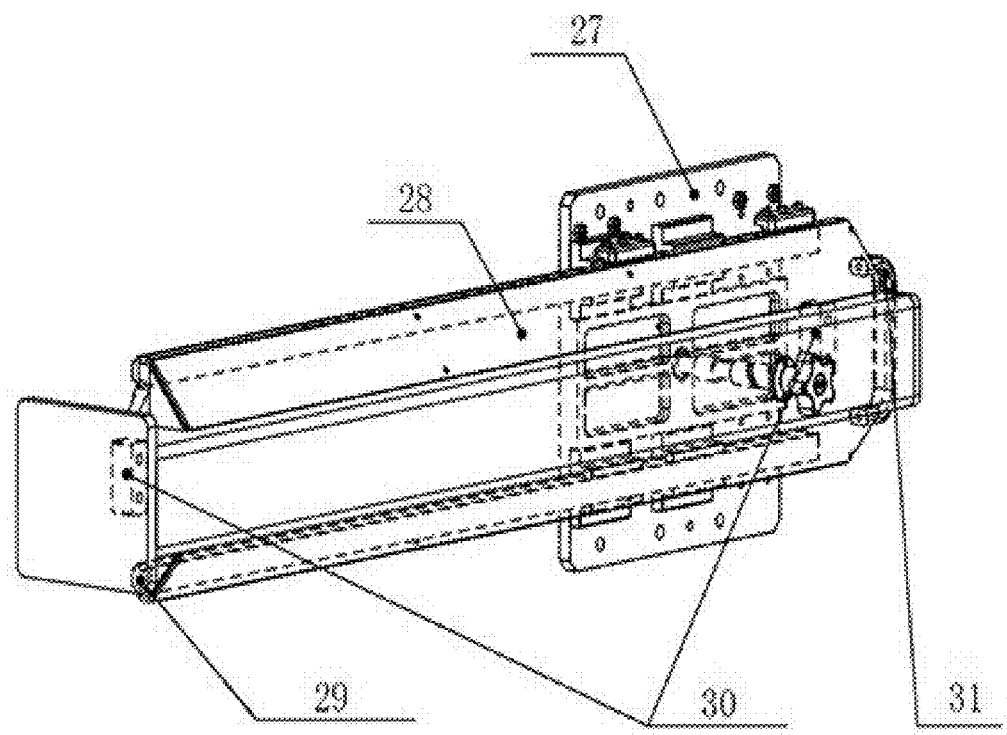
FIG. 9 is a structure diagram of the slide rail support according to the present application.

As shown in FIG. 9, the slide rail support 20 includes a base plate 27, a support body 28, a guide rail assembly 29, a stop block 30 and a handle 31. The base plate 27 is connected to the side of the hole positioner column 8 by screws and positioning pin assemblies 21. The guide rail assembly 29 is composed of 4 sets of sliders and 2 sets of slide rails. The sliders are fixed to the base plate 27, and the slide rails are fixed to the support body 28. In this way, the support body 28 slides through the slide rail to drive the hole positioner to move, and the slide rail support 20 can cause significant horizontal movement of the positioner assembly, therefore, it is mainly used for rough adjustment of the positioning process.

Figure 10A:
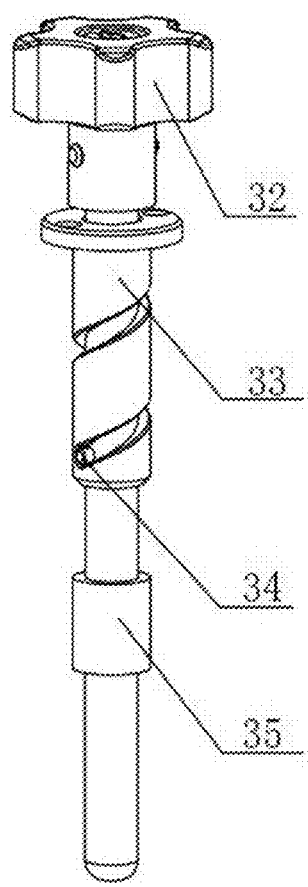
FIG. 10A is an overall appearance view of the structure of the positioning pin assembly according to an embodiment 1 of the present application.

As shown in FIG. 10A, the positioning pin assembly 21 is configured to fix the position of the slide rail support 20 to the hole positioner column 8, and to limit the lateral position of the slide rail support 20. In this embodiment, the positioning pin assembly 21 is a "spiral type" positioning pin assembly. The positioning pin assembly 21 includes an insert pin 32, a channel bushing 33, a cylindrical pin 34 and a bushing 35. The channel bushing 33 has a spiral track groove, and the spiral bushing 33 is fixed to the slide rail support 20. The bushing 35 is fixed to the base plate 27, the lower part of the insert pin 32 is connected to the bushing 35, and the middle of the insert pin 32 is provided with the cylindrical pin 34, which is configured to limit, so that the insert pin 32 slides out along the spiral track groove of the spiral bushing 33 during the inserting in and pulling out process, effectively preventing the insert pin 32 from falling.

Figure 11A:
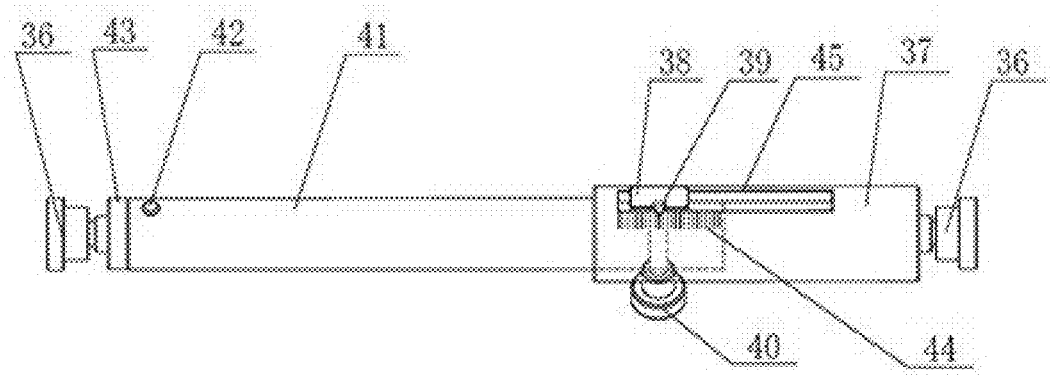
FIG. 11A is an overall appearance view of a strut positioner assembly according to the embodiment 1 of the present application.
Figure 11B:
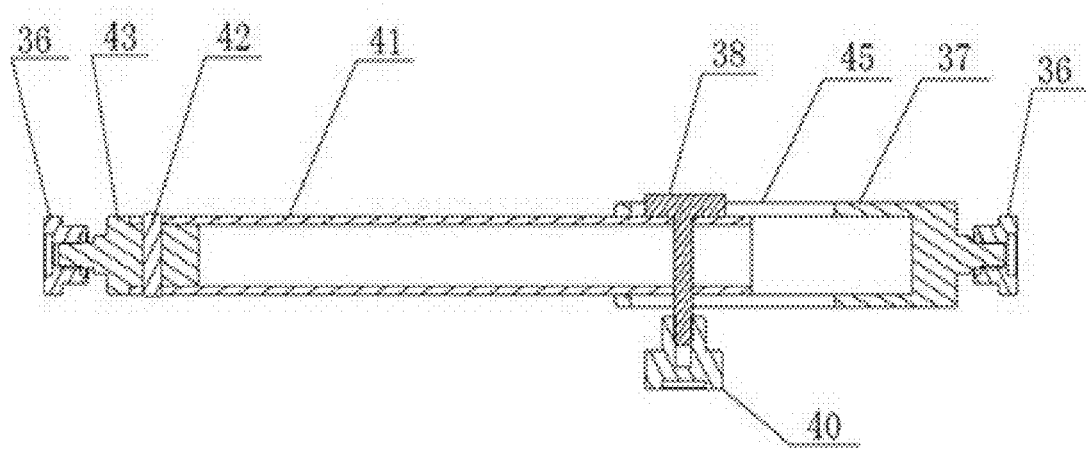
FIG. 11B is an axial sectional view of the strut positioner assembly according to the embodiment 1 of the present application.

As shown in FIG. 11A and FIG. 11B, the strut positioner assembly 4 is configured to perform positioning for two adjacent aircraft frames (such as the main frame and the fuselage secondary frame). Therefore, the strut positioner assembly 4 belongs to a relatively independent positioner assembly and can be used alone without being mounted on the hole positioner column 8, the pallet column 9 or other auxiliary support equipment. The strut positioner assembly 4 is a slidable strut positioner assembly that can achieve fine adjustment, and includes an abutting nut 36, a positioning sleeve 37, a pressing block insert pin 38, a pointer 39, a locking nut 40, a strut 41, a cylinder insert pin 42 and an end pin 43. In this embodiment, the end pin 43 is a structure in which a smooth rod is at one end and a threaded rod is at the other end. One end of the end pin 43 is inserted into one end of the strut 41, and the end pin 43 and the strut 41 are fixed by the cylindrical insert pin 42. The other end of the strut 41 is sleeved in the positioning sleeve 37, and the positioning sleeve 37 is provided with wedge-shaped grooves 45 on both sides along the axial direction. The wedge-shaped grooves 45 are strip-shaped slot holes with trapezoidal section arranged the length direction of the positioning sleeve 37. The pressing block insert pin 38 can be inserted into the wedge-shaped groove 45 on one side. The pressing block insert pin 38 is T-shaped structure and is composed of the pressing block and the threaded insert pin arranged perpendicular to the pressing block. The locking nut 40 is connected to the external thread of the threaded insert pin of the pressing block insert pin 38. By tightening the locking nut 40, the pressing block insert pin 38 and the wedge-shaped groove 45 of the positioning sleeve 37 can be compressed, and the relative position of the positioning sleeve 37 and the strut 41 can be fixed.

A pointer 39 is also arranged on the pressing block insert pin 38. The pointer 39 can be a separate component, or can be formed by etching/scoring on the pressing block insert pin 38. Correspondingly, the positioning sleeve 37 has a scale 44 arranged along its length direction, and the pointer 39 is used to indicate the scale 44, thereby determining the extension length of the strut 41 in the positioning sleeve 37.

Usually, a plurality of strut positioner assemblies 4 are usually arranged between the positioning surfaces of two frame parts (such as two main frames), and it is necessary to ensure that the vertical distances between the points of the two positioning surfaces are equal. Therefore, when the installer locates and installs, he can determine whether the scales on each strut positioner assembly are consistent by reading the scales on each strut positioner assembly 4 respectively. If they are consistent, it indicates that the two positioning surfaces are parallel, and if not, the extension length of the strut positioner assembly needs to be adjusted.

During the positioning process of the fuselage components by the strut positioner assembly, the pressing block insert pin 38 drives the strut 41 to slide along the wedge-shaped groove 45 of the positioning sleeve 37, and the pointer 39 can indicate the position of the wedge-shaped groove of the pressing block insert pin 38. When the abutting nut 36 at both ends of the strut positioner assembly contacts the parts of the fuselage, the locking nuts 40 are tightened, the relative position of the positioning sleeve 37 and the strut 41 is locked, and abutting nut 36 is screwed outward so that both ends of the strut positioner assembly 4 can be abutted against the workpiece. During the above positioning operation, what the pressing block insert pin 38 and the abutting nut 36 realize is the rough adjustment and positioning of the rod positioner 4, and what the abutting nut 36 realizes is the fine adjustment and positioning of the rod positioner 4. The fine adjustment and positioning is completed on the basis of the rough adjustment and positioning. Through the rough adjustment and fine adjustment of the strut positioner assembly 4, the self-positioning requirements of products with different frame distances can be met.

Figure 12:
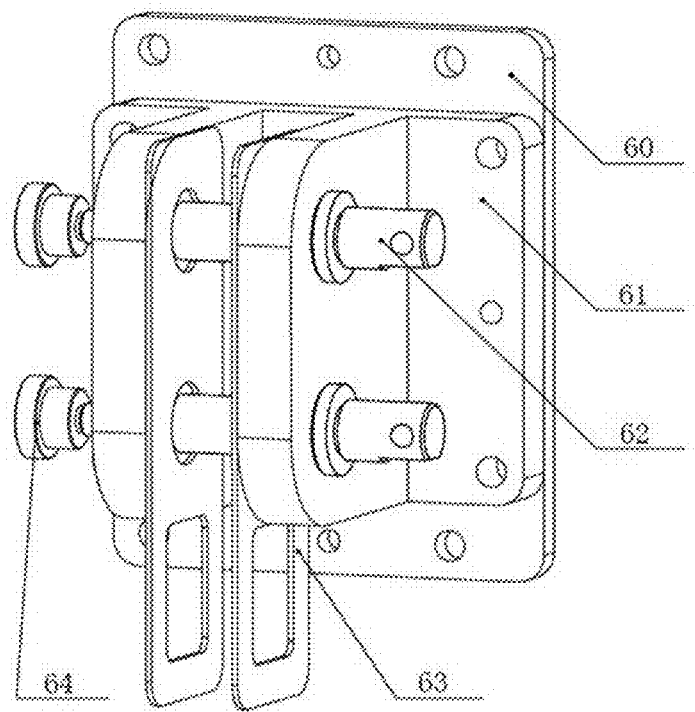
FIG. 12 is a structure diagram of an intersection point hole positioner according to the present application.

As shown in FIG. 12, the intersection point hole positioner 5 is configured to perform hole positioning for the connection intersection point between the fuselage and the wing. The intersection point hole positioner 5 includes a mounting base 60, an intersection point hole positioning support 61, an insert pin 62, a positioning lug 63 and a compression nut 64. The mounting base 60 is fixed to the hole positioner column 8, and the mounting base 60 is bolted to the intersection point hole positioning support 61. The intersection point hole positioning support 61 is formed by vertical welding of a base and two mutual parallel support seats, each of the support seats is provided with two perforations, and the two rows of perforations on the two support seats are parallel to each other. The two pins 62 pass through two perforations on one support seat respectively, then pass through two positioning lugs 63 respectively, and pass through two perforations on the other support seat respectively. One end of each pin 62 is provided with a compression nut 64, thereby preventing the pin from slipping and being lost during use. The intersection joint is the key positioning point, and the intersection point positioner is used to perform positioning for the main frame with wing body connection joints, such main frame will serve as the reference frame for the subsequent self-positioning of frame components.

Figure 13A:
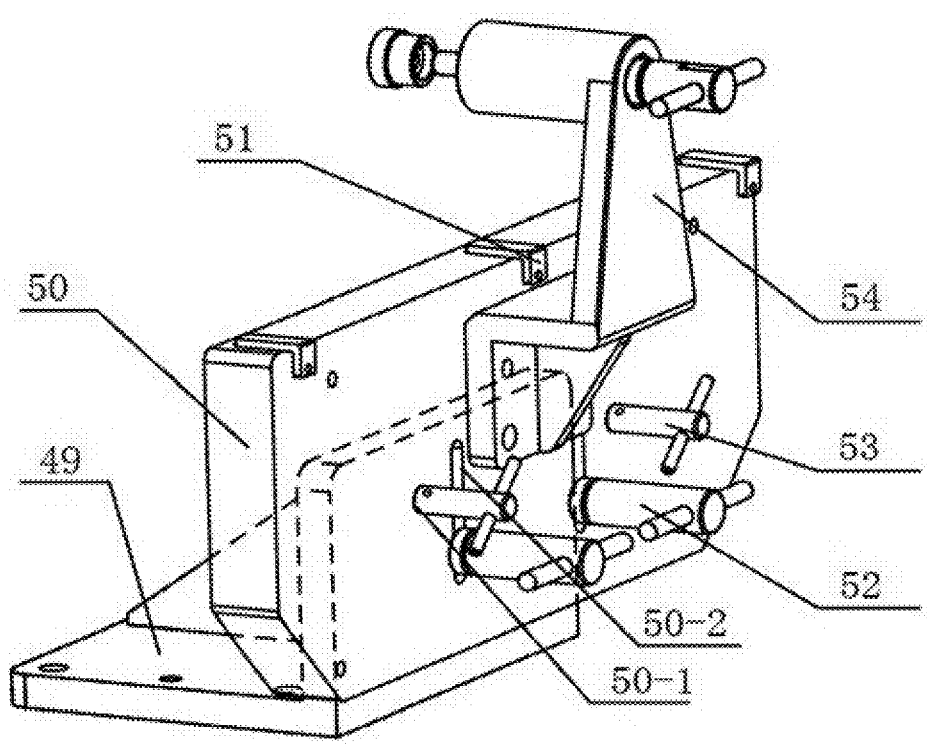
FIG. 13A is a structure diagram of the pallet assembly according to the present application.
Figure 13B:
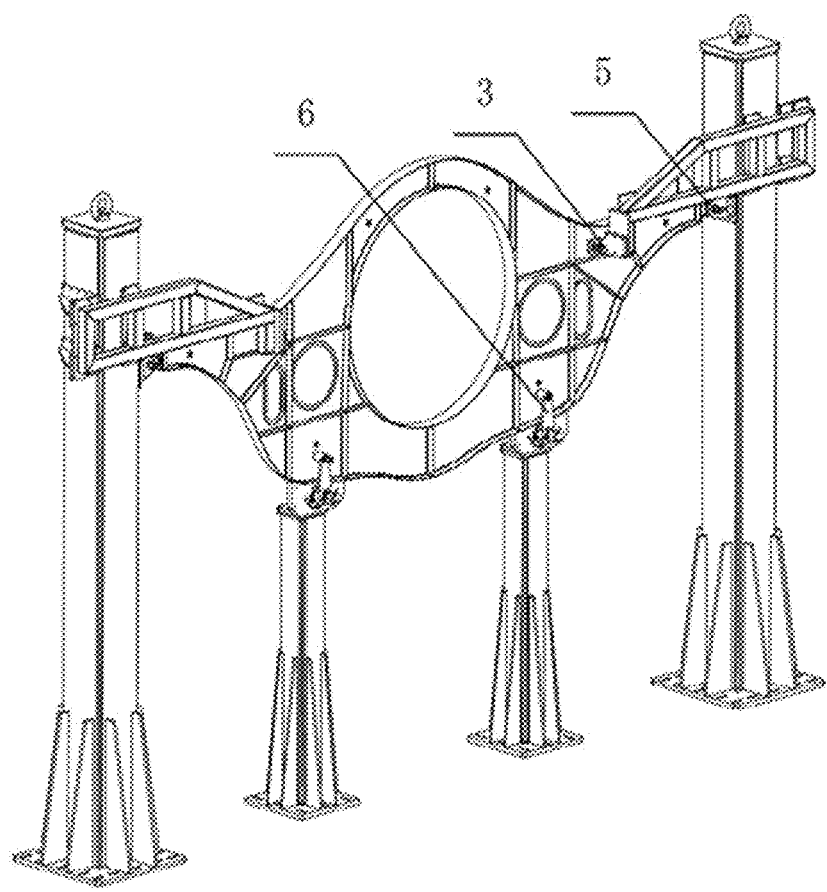
FIG. 13B is a schematic diagram of assembly of the pallet assembly according to the present application.

As shown in FIG. 13A and FIG. 13B, the pallet assembly 6 includes a support 49, a pallet 50, a gasket 51, a threaded pin 52, a positioning pin 53 and a hole positioner 54. The support 49 is fixed to the hoisting plate 11-1 at the top of the pallet column. The cross section of the support 49 is an L-shaped structure, and one side of the support 49 is connected to the pallet 50 by a plurality of threaded pins 52 and positioning pins 53. The pallet 50 is a plate-shaped component, and both sides of the pallet 50 are provided with positioning circular holes 50-1 and positioning long circular holes 50-2. Positioning pins 53 are connected to the pallet 50 after passing through the positioning circular holes 50-1, and threaded pins 52 are connected to the pallet 50 after passing through the positioning long circular hole 50-2. The positioning long circular hole 50-2 can be used to adjust the vertical positioning position of the pallet 50.

A plurality of gaskets 51 are embedded on the top of the pallet 50, and a hole positioner 54 is fixedly connected to one side of the pallet 50. The pallet assembly 6 is used to support the main frame structure of the aircraft and position the holes; the upper surface of the pallet is the product shape, which can meet the supporting function under two working conditions: when the skin is not connected, the shape of the frame is positioned; after the skin is connected, a gasket 51 is added to support the shape of the skin.

Figure 14A:
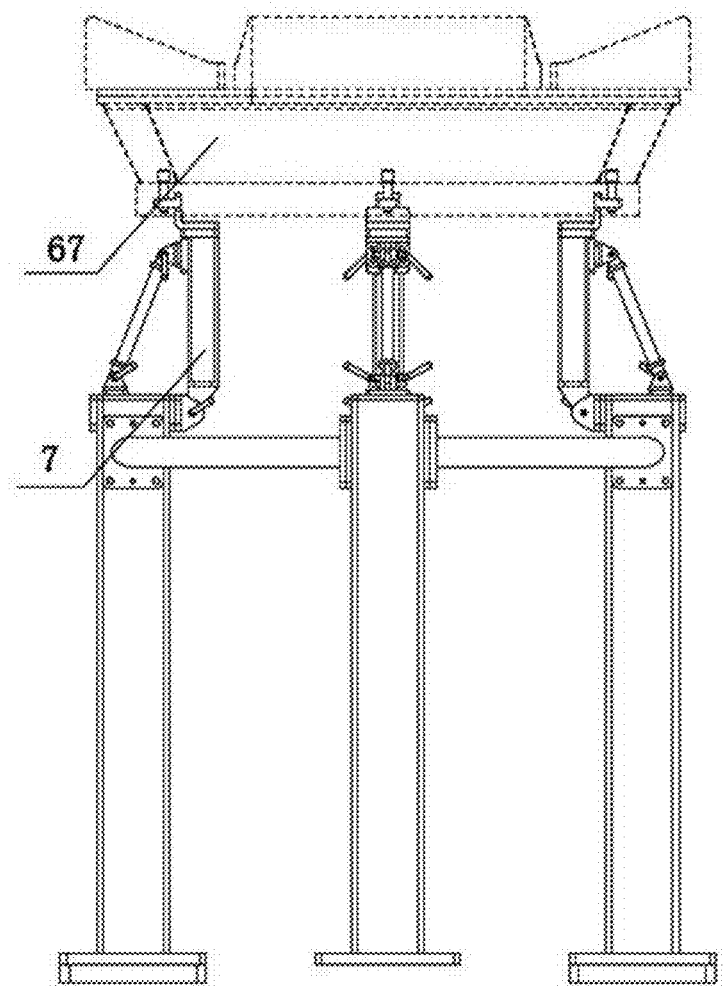
FIG. 14A is a front elevation structure diagram of a rotating top support positioner assembly according to the present application.
Figure 14B:
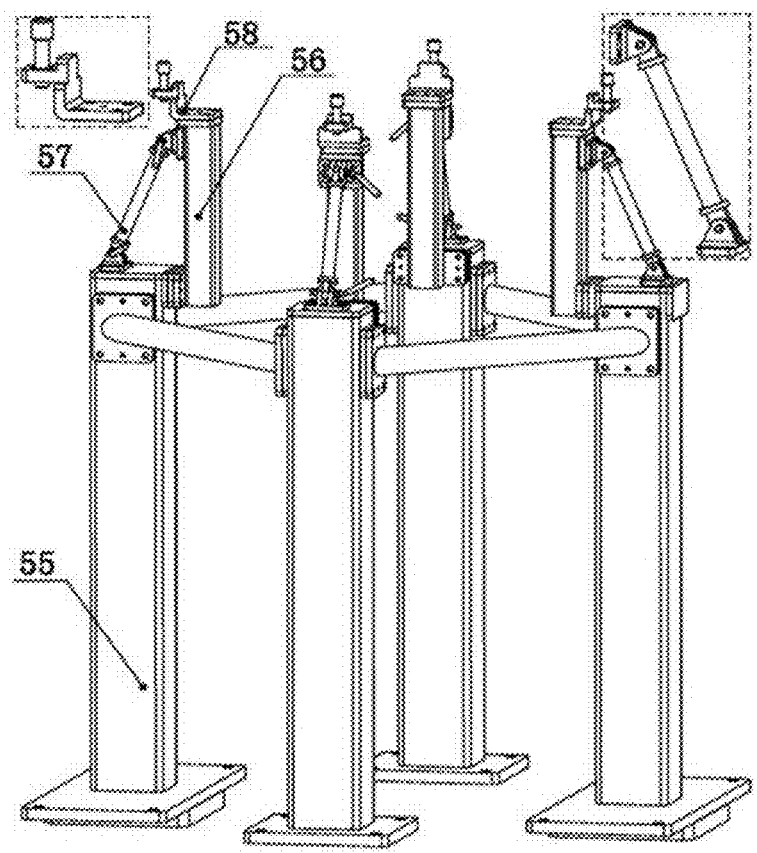
FIG. 14B is a three-dimensional structure diagram of the rotating top support positioner assembly according to the present application.
Figure 14C:
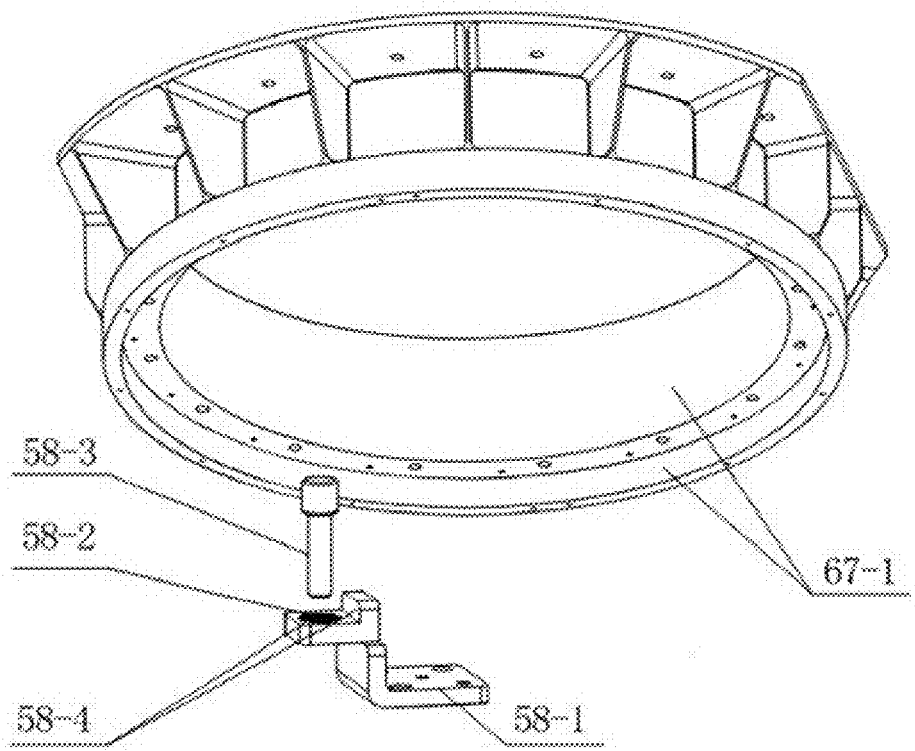
FIG. 14C is a partially exploded view of positioning of the rotating top support positioner assembly according to the present application.

As shown in FIGS. 14A, 14B and 14C, the special positioning assembly for a rotating top support 7 is used to perform positioning for the circular product 67 (such as the rotary top) of the aircraft, and the special positioning assembly for a rotating top support 7 includes a framework a positioner support 56, an auxiliary strut 57 and a rotating top hole positioner 58. The upper parts of a plurality of frameworks 55 are connected to each other by crossbeams, and the top end surface of each framework 55 is hinged with one end of the auxiliary strut 57, and one side of the framework 55 adjacent to the end surface is fixedly connected to one end of a vertically arranged positioner support 56, the other end of the positioner support 56 is hinged to the other end of the auxiliary strut 57, and the top of the positioner support 56 is connected to the rotating top hole positioner 58.

In addition, as shown in FIG. 14C, the rotating top hole positioner 58 includes a rotating top positioning pallet 58-1 and a positioning pin 58-3, the rotating top positioning pallet has an L-shaped section. One end of the rotating top positioning pallet 58-1 is provided with two positioning surfaces 58-4 perpendicular to each other, one of the positioning surfaces 58-4 is provided with a positioning hole 58-2, into which the positioning pin 58-3 can be inserted, and two positioning surfaces 58-1 are bonded to two surfaces 67-1 to be positioned of the circular product 67 respectively.

The special positioning assembly for a rotating top support 7 adopts a point distribution structure, and adopts a 4-point positioning for the overall circular product 67 (about 700 mm in diameter), on the one hand, which is beneficial to reduce the difficulty of manufacturing and processing, and on the other hand, is beneficial to increase the assembly space of the aircraft. The framework 55 is mainly composed of square aluminum tubes and circular aluminum tubes, and the square aluminum tubes are connected as a whole through circular aluminum tubes to form a framework structure and improve the stability of the framework; four sets of rotating top hole positioners 58 are connected to the positioner support 56 by bolts, and is distributed at four points in space to position and compress the outer surface of the product, avoiding problems such as large difficulty of integral positioning and processing, insufficient space or the like; the auxiliary strut 57 adopts a fork ear type rotating structure at both ends, which can realize connection at different angles, and provide auxiliary support for the positioner support 56, enhancing the connection rigidity and improving the stability.

Figure 15A:
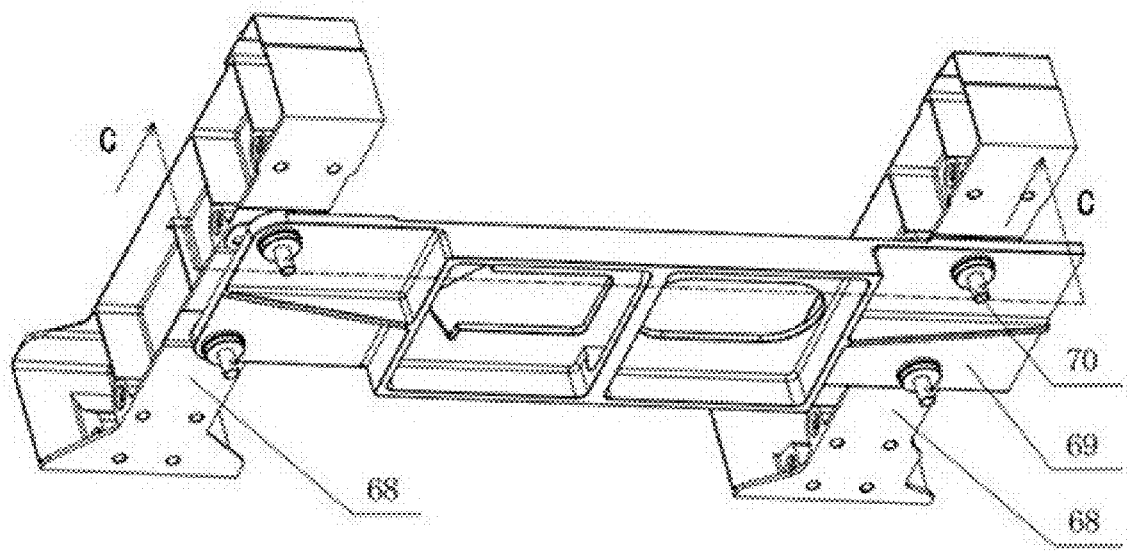
FIG. 15A is a three-dimensional structure diagram of a traditional parts tooling positioning assembly.
Figure 15B:
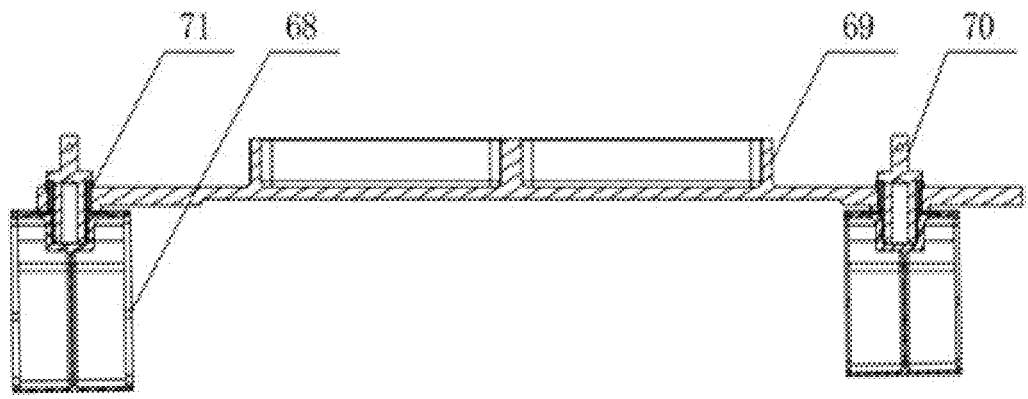
FIG. 15B is a cross-sectional view of the parts tooling positioning assembly according to the present application.
Figure 15C:
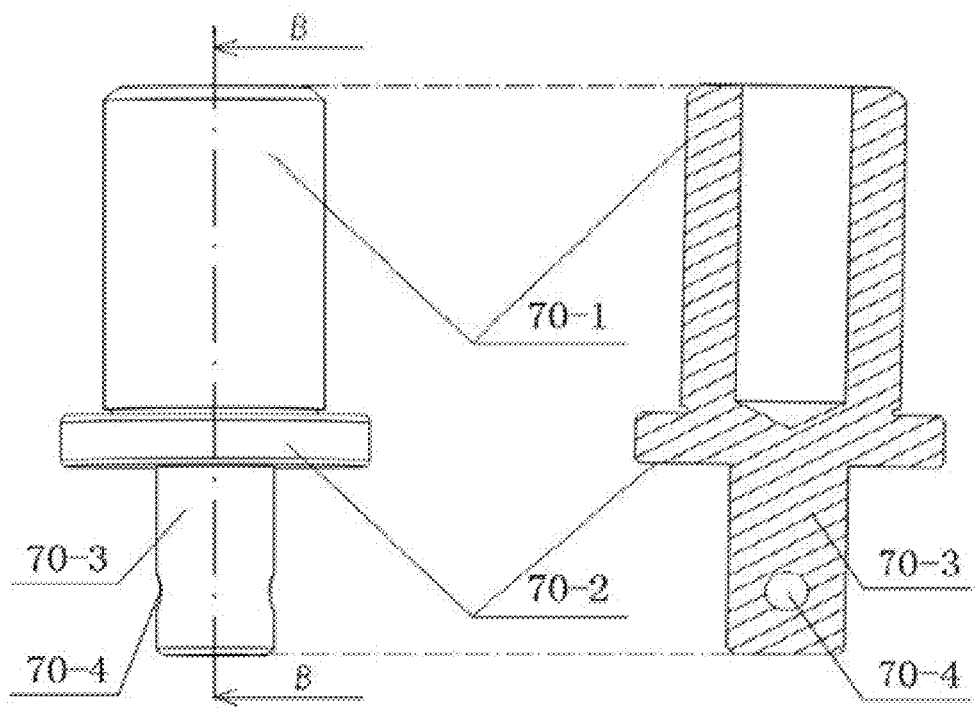
FIG. 15C is a schematic diagram of structure of the large-small head insert pin of the parts tooling positioning assembly according to the present application.

As shown in FIGS. 15A, 15B and 15C, the tooling self-positioning of parts products adopts parts tooling positioning assembly to position and assembly, and positioning is performed for the relative positions of non-frame parts. The parts tooling positioning assembly includes parts tooling body 69 and large-small head insert pin 70. The parts tooling body 69 is a rectangular shape structure, with positioning holes arranged at four corners. Four large-small head insert pins 70 are respectively inserted into the above-mentioned positioning holes, and are connected to holes to be positioned arranged on the parts product 68. There is a ring gasket 71 sandwiched between the hole to be positioned/positioning hole and the large-small head insert pins 70. The positioning assembly of the parts tooling is used to perform positioning for aircraft structural components that do not have high requirements for parts of product but have high requirements for relative position between two products, that is, such self-positioning tooling is not related to the assembly fixture framework (main frame, fuselage secondary frame, main beam), only ensuring the relative position relationship between products, instead of positioning the absolute position of the product in the aircraft coordinate system, such as the positioning of the hanger joint.

Furthermore, the large-small head insert pins 70 is formed by sequentially connecting a large head portion of the insert pin 70-1, an annular connecting portion 70-2 and a small head portion of the insert pin 70-3, the large head portion of the insert pin 70-1 is cylindrical, the small head portion of the insert pin 70-3 is provided with a small head perforation 70-4 through which a tether can passes. When the self-positioning of the tooling is performed for parts product, the large head portion of the insert pin 70-1 is inserted into the above-mentioned positioning hole and the hole to be positioned, so that the small head portion of the insert pin 70-3 is arranged outwards.

Embodiment 2

Figure 10B:
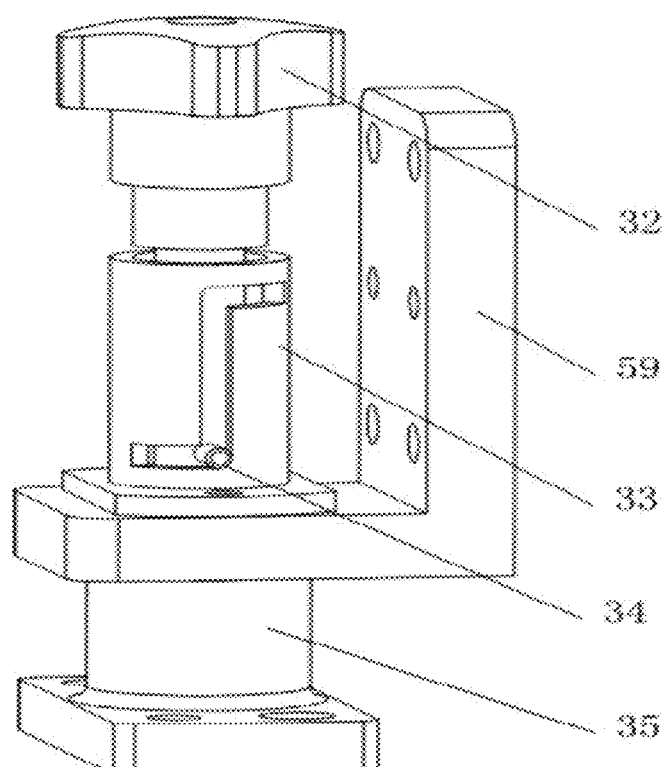
FIG. 10B is an overall appearance view of the structure of the positioning pin assembly according to an embodiment 2 of the present application.
Figure 10C:
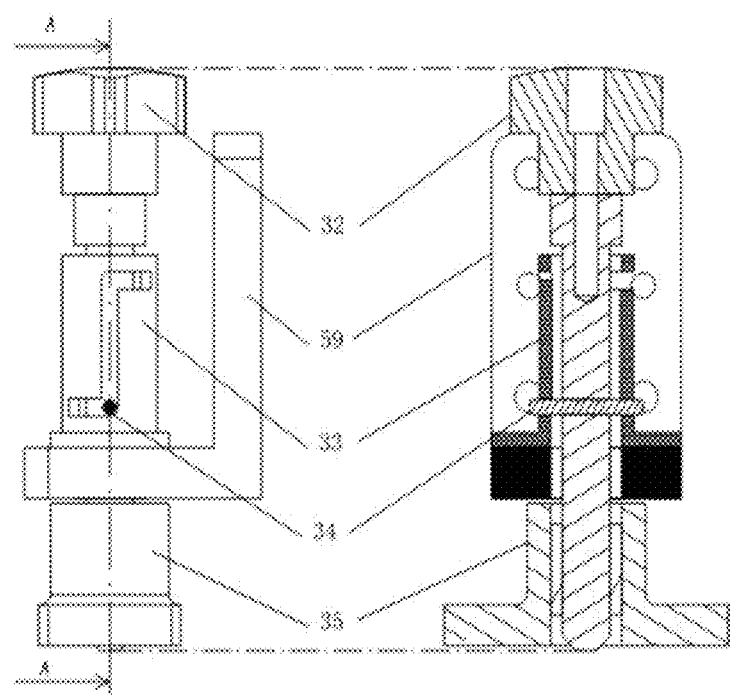
FIG. 10C is a partially exploded schematic diagram of the structure of the positioning pin assembly according to the embodiment 2 of the present application.

As shown in FIGS. 10B and 10C, in this embodiment, the positioning pin assembly 21 is a "Z-shaped" positioning pin assembly, including an insert pin 32, a groove bushing 33, a cylindrical pin 34 and a bushing 35. The groove bushing 33 has a track groove in a Z-shaped, and is fixed to the slide rail support 20. The bushing 35 is fixed to the bottom plate 27, and the lower part of the pin 32 is connected to the bushing 35. The middle part of the pin 32 is provided with a cylindrical pin 34, and the cylindrical pin 34 is used for limiting. The pin 32 slides along the "Z-shaped" track groove, and rotates to lock when it slides to the bottom of the track groove. During the insertion and pulling out, the pin 32 slides out along the top of the "Z-shaped" track groove of the groove bushing 33, effectively preventing the pin 32 from falling. Compared to the "spiral-shaped" positioning pin assembly, the "Z-shaped" positioning pin assembly in this embodiment can realize the rapid installation and removal of each part of the positioning pin assembly, effectively solving the on-site management difficulties caused by the need for pin positioning at multiple locations during aircraft assembly, avoiding the occurrence of parts tooling, and improving the overall efficiency of tooling.

Figure 11C:
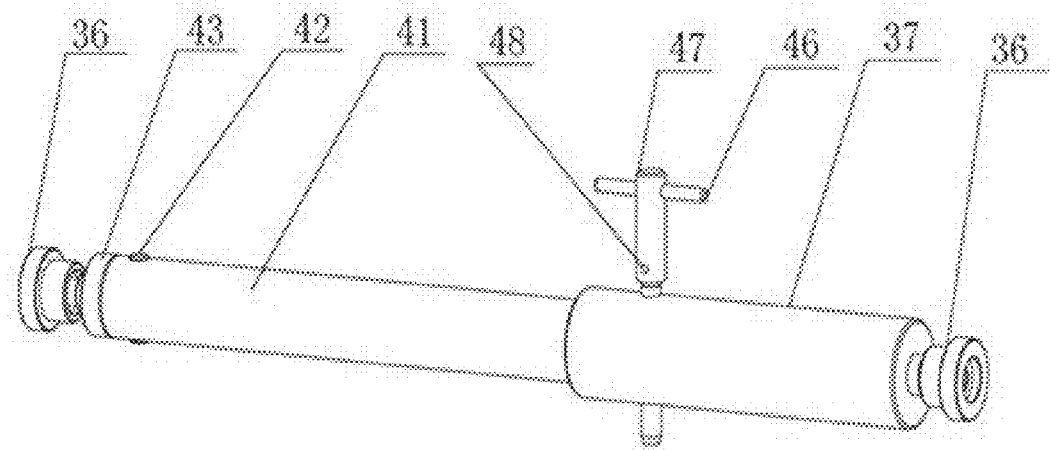
FIG. 11C is an overall appearance view of the strut positioner assembly according to the embodiment 2 of the present application.
Figure 11D:
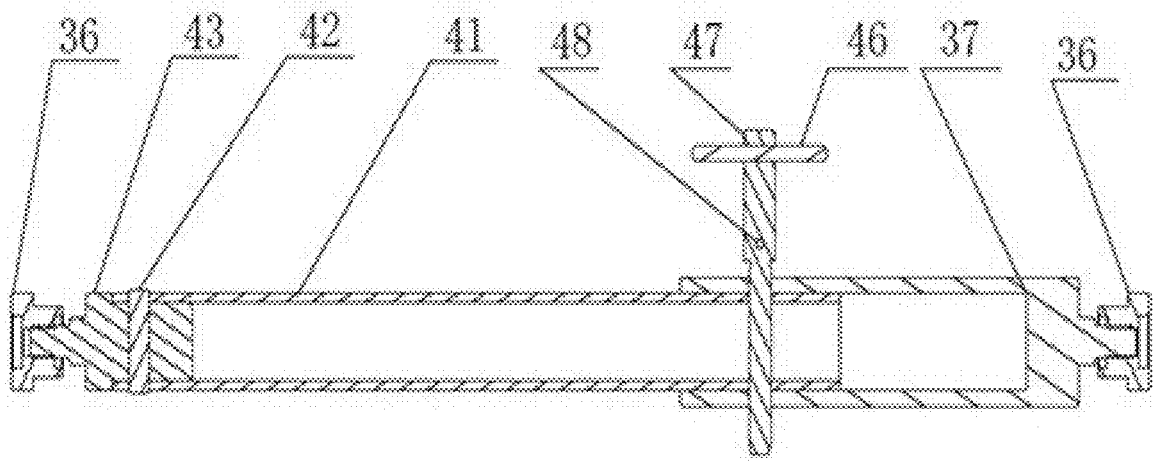
FIG. 11D is an axial sectional view of the strut positioner assembly according to the embodiment 2 of the present application.

As shown in FIGS. 11C and 11D, in this embodiment, the strut positioner assembly 4 is a fixed strut positioner assembly that can realize fine adjustment. The strut positioner assembly includes an abutting nut 36, a positioning sleeve 37, a strut 41, a cylinder insert pin 42, an end pin 43 and T-shaped insert pin. In this embodiment, the end pin 43 is a structure in which both ends are threaded rods, one end of the end pin 43 is screwed to one end of the strut 41, and the end pin 43 and the strut 41 are fixed by a cylindrical insert pin 42. The other end of the strut 41 is sleeved in the positioning sleeve 37, and one end of the positioning sleeve 37 is screwed to the abutting nut 36. The T-shaped insert pin is composed of a handle 46 and a rod positioning insert pin 47. The rod positioning insert pin 47 can be inserted into the perforation of the positioning sleeve 37 and the perforation of the strut 41. The middle part of the rod positioning insert pin 47 is provided with a tether perforation 48. After the T-shaped insert pin is inserted into the positioning sleeve 37, the tether perforation 48 is used to penetrate high-strength binding straps such as steel wire ropes to bind and fix the T-shaped insert pin.

During the positioning process of the fuselage components by the above-mentioned strut positioner assembly 4, when the abutting nuts 36 at both ends of the strut positioner assembly contact the fuselage components, the T-shaped insert pin is inserted into the perforation of the positioning sleeve 37 and the perforation of the strut 41, the relative position of the positioning sleeve 37 and the strut 41 is locked, and then the abutting nut 36 is screwed outward, so that the two ends of the strut positioner assembly 4 can be pressed against the workpiece, During the above-mentioned positioning operation, by the self-positioning of the above-mentioned strut positioner assembly 4, the self-positioning requirements of products with different frame distances can be met.

Embodiment 3

The fuselage structure mainly includes the main frame and the main beam of the fuselage. Therefore, the fuselage assembly fixture is mainly for the positioning of the frame and beam structures. The traditional assembly method adopts the tooling positioning for most of the fuselage main frame and fuselage main beam structures. Therefore, due to the compact structure of the fuselage, the tooling structure is exceptionally complex, with numerous positioners. The traditional assembly tooling device or tooling system has shortcomings such as a closed framework structure and multiple positioners, which not only increases the tooling manufacturing cycle and costs, but also has a significant impact on the efficiency of on-site assembly. Therefore, in order to improve the efficiency of aircraft assembly and reduce the assembly cycle and cost, the present application proposes an assembly method based on a self-positioning assembly system for rapid assembly of an aircraft.

Figure 16A:
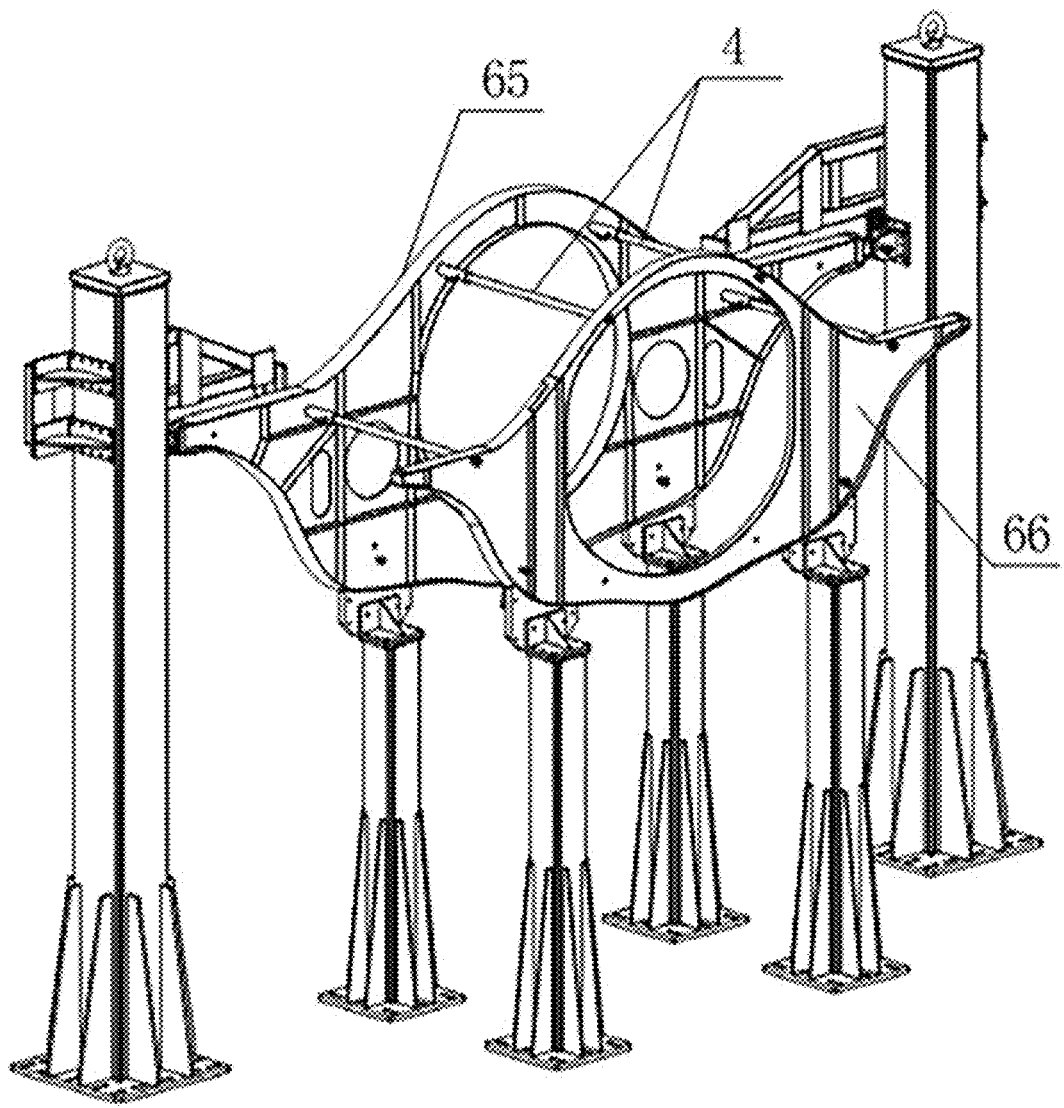
FIG. 16A is a schematic diagram of the layout of the system assembly process of the traditional frame positioning method.

FIG. 16A shows the frame positioning method of the traditional tooling structure: the traditional tooling adopts four-point positioning. In FIG. 16A, the I frame body 65 is the main load-bearing frame, which adopts four-point positioning of tooling. The II frame body 66 is an auxiliary structural frame, in the overall structure of the fuselage, since the rigidity is weak, it is not used as the main load-bearing structure, and has little influence on the overall shape of the aircraft. Therefore, if the traditional tool positioning method is adopted, a large number of tooling positioning structures and frameworks will be added, and the assembly space will be occupied.

Figure 16B:
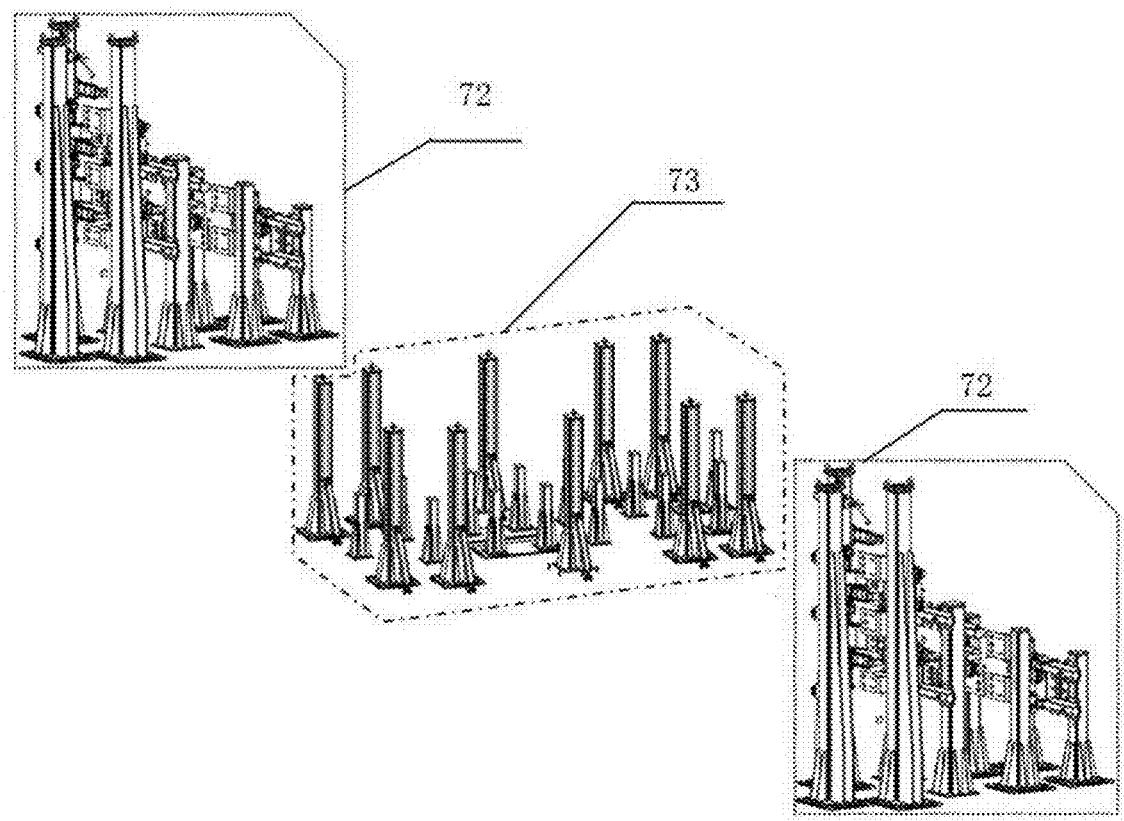
FIG. 16B is a schematic diagram of the layout of the system assembly process of the self-positioning assembly positioning method without fixture according to the present application.

In order to further improve the assembly efficiency and optimize the assembly resources, the present application proposes an aircraft fuselage assembly process method without a fixture assembly, and adopts a positioning method with fewer positioners for such structural frame. As shown in FIG. 16B, based on the aircraft fuselage assembly process method without fixture assembly proposed by the patent of the present invention, the II frame adopts tooling positioning and auxiliary self-positioning to perform positioning, which reduces tooling positioning structures and saves assembly costs. With the I frame body 65 that has been completely positioned by the tooling as the positioning reference of the II frame body 66, the positioning is performed by using the rod positioner 4. Considering the weight of the overall fuselage structure at the bottom, a pallet positioning assembly is arranged for structural support and hole positioning, and auxiliary positioning is performed for the II frame by the hole positioner.

Figure 17:
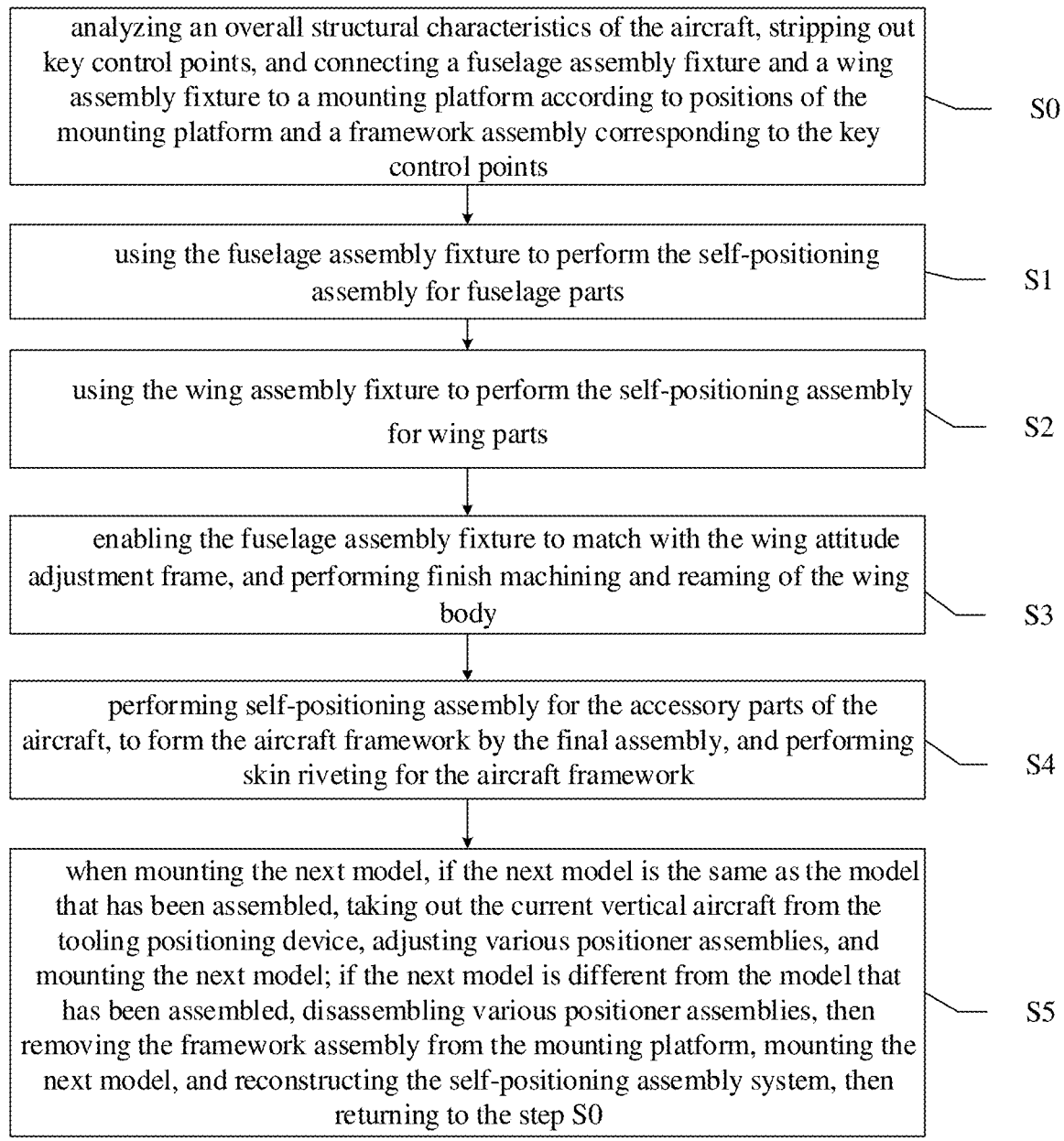
FIG. 17 is a flowchart of the self-positioning assembling method without fixture according to the present application.

The present application aims at the shortcomings of the traditional tooling structure, provides an assembly method based on the self-positioning assembly system for rapid assembly of an aircraft. As shown in FIGS. 16B and 17, the assembly method can be divided into three directions of fuselage assembly, wing assembly and wing body finishing assembly: changing the assembly method of large-size aircraft structures from the traditional method of completely relying on the assembly fixture to the methods of relying on flexible assembly tooling, semi-flexible assembly tooling assembly and self-positioning assembly of parts, reducing the dependence of aircraft assembly on special assembly fixture, and greatly reducing the cost of aircraft assembly.

Principles of self-positioning assembly are: 1) to simplify the design and manufacture of the assembly fixtures, reduce the number of positioning, and improve the openness of the operating space, in product design, it is considered that the assembly fixture only performs positioning for the main frame, and the main beam realizes self-positioning by structural design; 2) Considering the feasibility and convenience of air inlet assembly, the aircraft frame is segmented. When assembling, the air inlet is positioned, then the main frame is positioned, and finally the beam is self-positioned and installed to complete the assembly; 3) the assembly is mainly based on the process holes of the main frame and the intersection point holes of the wing body, while the other components are assembled and connected by self-positioning of the parts; 4) the connection holes between the panel skin and the framework of the composite material adopt numerically controlled final holes for direct connection and assembly; 5) the process information required in the manufacturing process is coordinated and transmitted using the traditional process digital model.

In order to further solve the problem of precise assembly of various parts of the aircraft without fixture, the present application utilizes the high-precision processing characteristics of the CNC parts, relies on the structure of the parts themselves for multi-part self-positioning assembly, and only a few other parts are assembled by means of tooling positioning. The fuselage structure of the general model, except for the fuselage skin and the air inlet, the rest of the parts all adopt CNC machine assemblies. In order to ensure the quality requirements of the overall assembly of the fuselage, only the main assembly feature control points of the fuselage (including main load-bearing structures, key coordination intersections, flight safety risk points, design separation surfaces, etc.) are selected for tooling positioning. The assembly of the overall frame of the fuselage is completed by the assembly of feature structures; for the assembly of other non-key parts, assembly is carried out according to the spatial connection relationship between parts by using the key features of the parts themselves (hole system, profile, etc.) and the structure of the fuselage body that has been positioned by the assembly fixture as the assembly reference, so as to achieve the purpose of making the overall fuselage size and outline meet the requirements of assembly precision and assembly accuracy by controlling the key assembly features of the fuselage.

As shown in FIG. 17, the aircraft assembly process method of the non-fixture assembly involves the overall assembly of the fuselage and the overall assembly of the wing, specifically including the following steps:
   step S0: analyzing an overall structural characteristics of the aircraft, striping out the key control points, and connecting the fuselage assembly fixture 72 and the wing assembly fixture 73 to the mounting platform 1 according to the mounting platform 1 corresponding to the key control points and the position of the framework assemblies.

In the above steps, stripping out the key control points also includes the following methods:
   1) the main load-bearing structure of the aircraft. For the fuselage, the frame structure needs to be positioned by tooling. The main frame of the landing gear before installation has a large load-bearing force during the take-off and landing process of the aircraft. Therefore, positioning tooling is required to ensure the installation accuracy, at the same time, as the positioning reference of the longitudinal beam structure of the fuselage; in addition, the position where the front fuselage is connected to the lip is the main air inlet, so the requirements for appearance are also high; for the wing part, key trusses and key ribs require tooling positioning;

2) key coordination intersection points during the aircraft assembly process: for the fuselage, the key coordination intersection points are the vertical tail mounting intersection point joint, the landing gear door mounting intersection point joint, the rudder surface mounting intersection point, and the engine mounting intersection point, etc.; for the wing, the key coordination intersection point is the joint assembly;

3) the structure of important parts that affect flight safety, that is, the intersection point of the main axis of the landing gear that affect the landing safety of the aircraft, includes the front landing gear axis and the main landing gear axis;

4) the coordination structure of aircraft design separation surface and the position structure of process separation surface. For the fuselage part, the connection between the general nose cover, tail cover, wing part and the fuselage are generally the design separation surface; for the fuselage part, the outer surface of the skin is generally the design separation surface. Because the structure of these parts has high requirements for the coordination of aircraft assembly, both the main frame and wing-body intersection point joint structure require tooling positioning and assembly.

On the basis of the completion of step S0, proceed to steps S1 and S2, and the specific tooling steps are as follows:

step S1: self-positioning assembly of fuselage components, as shown in FIG. 18, the step S1 specifically includes the following steps S11-S16:

step S11: hoisting the main frame of the fuselage (such as frames 2150 to 5700) and placing it on the fuselage assembly fixture 72, supporting the bottom of the main frame by the pallet assembly 6 and positioning the bottom of the main frame by the hole positioner assembly 3, so that the slide rail support 20 drives the hole positioner 19 to slide to the position to be positioned, tightening the positioning threaded pin 23, locking the locking threaded pin 26; and using the intersection point hole positioner 5 to perform intersection point hole positioning on the frame structure with the intersection point joint;

step S12: after completing the step S11, hoisting the secondary frame of the fuselage and placing the secondary frame of the fuselage on the pallet assembly 6, and performing the self-positioning assembly on the secondary frame of the fuselage and the main frame of the fuselage by the strut positioner assembly 4;

step S13: after completing the step S12, hoisting the main beams of the fuselage (such as wall panel beams, edge beams, etc.) and placing them on the fuselage assembly frame 72. For the key coordination intersection point, using the intersection point hole positioner 5 to perform positioning for the intersection point hole, and assembling them with the main frame of the fuselage;

step S14: after completing the step S13, hoisting the rotating top and placing it on the special positioning assembly for a rotating top support 7, and the rotating top hole positioner 58 performs hole positioning for the rotating top;

step S15: after completing the step S14, for the non-frame parts of the fuselage that have relative position requirements, using the parts tooling positioning assembly to perform positioning; and step S16: for the rest of the aircraft part products, by using the main frame and the main beam that have been positioned by the tooling as the positioning reference, positioning and assembling through the structural contours and self-positioning holes of the rest of the aircraft part products.

Figure 19:
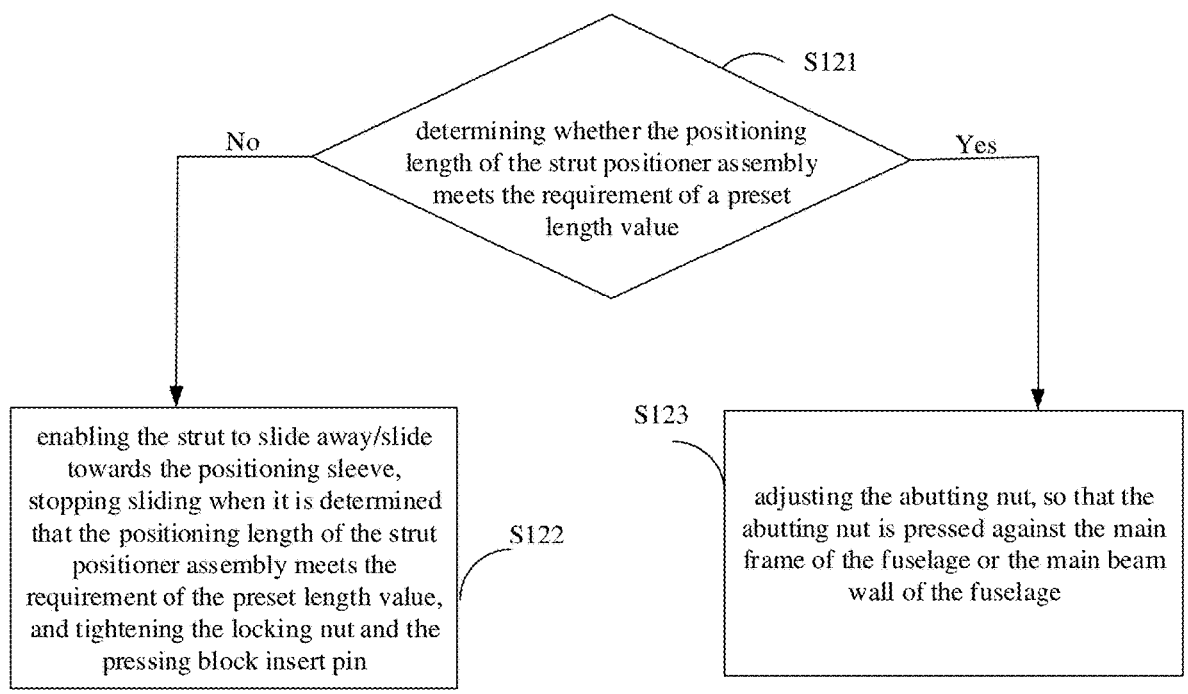
FIG. 19 is a flowchart of determining whether the positioning length of the strut positioner assembly meets the requirements of the preset length value according to the present application.

The strut positioner assembly 4 has certain particularity during the positioning process, and can realize the self-positioning of the tooling according to the positioning surface of the aircraft frame parts without relying on the auxiliary support devices such as the hole positioner column and the pallet column. Therefore, as shown in FIG. 19, the above-mentioned step S12 also further comprises the following steps:

step S121: determining whether the positioning length of the strut positioner assembly 4 meets the requirement of the preset length value, if not, the step proceeds to step S122, and if satisfy the requirement, the step proceeds to step S123;

step S122: sliding the strut 41 away/towards the positioning sleeve 37. When it is determined that the positioning length of the strut positioner assembly 4 meets the requirement of the preset length value, stopping slide and tightening the locking nut 40 and the pressing block insert pin 38; and step S123: adjusting the abutting nut 36 so that the abutting nut 36 is firmly against the main frame of the fuselage or the main beam wall of the fuselage.

Figure 20:
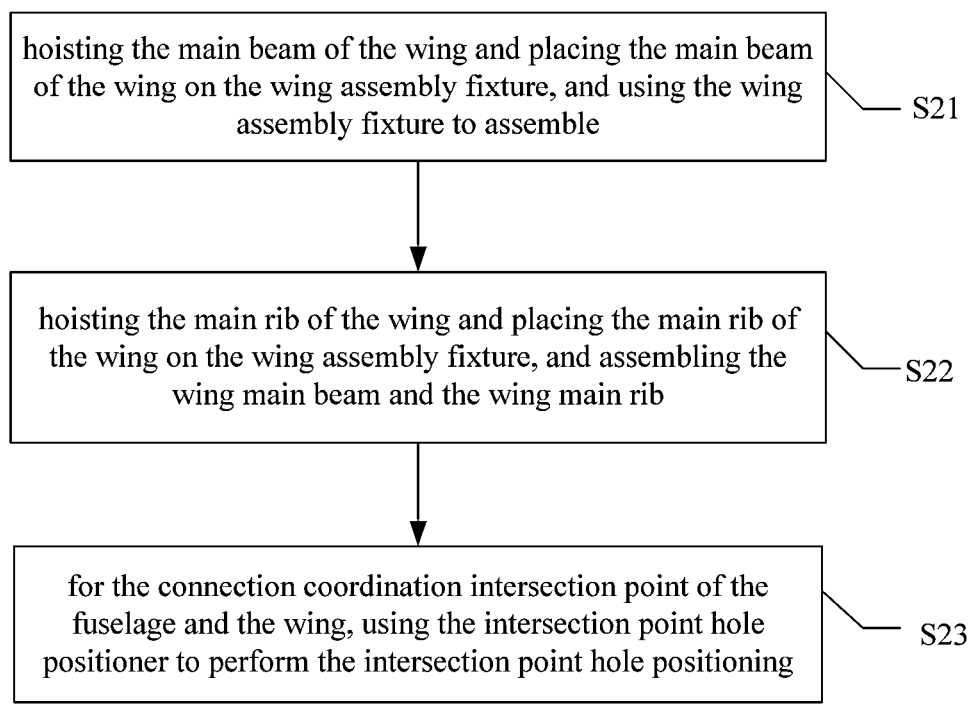
FIG. 20 is a flowchart of the self-positioning assembling for wing parts according to the present application.

Step S2, self-positioning assembly of wing parts, as shown in FIG. 20, the step S2 specifically includes the following steps S21-S23:

step S21: hoisting the main beam of the wing and placing it on the wing assembly fixture 73, and using the wing assembly fixture 73 for assembly;

step S22: hoisting the main ribs of the wing and placing them on the wing assembly fixture 73, and assembling the main beam of the wing with the main ribs of the wing; and step S23: for the design separation surface, the process separation surface, and the connection coordination intersection point between the fuselage and the wing, using the intersection point hole positioner 5 to perform positioning for the intersection point hole.

Because the self-positioning assembly of the fuselage parts can be performed by the fuselage assembly fixture 72, the self-positioning assembly of the wing parts can be performed by the wing assembly fixture 73, and the fuselage assembly fixture 72 and the wing assembly fixture 73 are mutually independent fixtures, therefore, the self-positioning assembly step S1 of the fuselage parts and the self-positioning assembly step S2 of the wing parts can be performed simultaneously or separately. In the above technical solution, the fuselage assembly fixture 72 adopts the fuselage assembly fixture commonly used in the prior art.

Step S3, enabling the fuselage fixture to match with the wing attitude adjustment frame, and performing finish machining and reaming of the wing body.

Step S4, performing self-positioning assembly for the accessory parts of the aircraft, to form the aircraft framework by the final assembly, and performing skin riveting for the aircraft framework.

Step S5, when the next model is installed, if the next model is the same as the model that has been assembled, there is no need to disassemble the aircraft tooling positioning device for self-positioning assembly. Taking out the current stand-up aircraft from the tooling positioning device, adjusting various positioners or positioner assemblies, and mounting the next model; if the next model is different from the model that has been assembled, disassembling the various positioners or positioner assemblies, then disassembling the framework assembly from the mounting platform, mounting the next model, and reconfiguring the self-positioning assembly system, the step returns to step S0.

The assembly fixture based on the product self-positioning assembly of the present application adopts a dispersed column assembly method, which changes the traditional closed frame structure assembly, performs positioning assembly for the main frame and beam structures, and adopts a self-positioning tooling structure to maximize the openness of the assembly tooling. At the same time, the framework adopts standardized column structure, standardized interface form, and can be disassembled and reconstructed as a whole, which greatly shortens the assembly cycle and improves the reuse rate of tooling.

The above descriptions are only preferred embodiments of the present application, and are not intended to limit the present application. Any modifications, equivalent substitutions and improvements made within the spirit and principles of the present application should be included in the scope of the present application.

What is claimed is:

1. A self-positioning assembly system for rapid assembly of an aircraft, comprising a mounting platform, a framework assembly, a plurality of hole positioner assemblies, a plurality of strut positioner assemblies and a plurality of pallet assemblies, wherein the framework assembly is mounted on the mounting platform and comprises a plurality of hole positioner columns and a plurality of pallet columns, each hole positioner assembly of the plurality of hole positioner assemblies is arranged on a respective hole positioner column of the plurality of hole positioner columns and/or a respective pallet columns of the plurality of pallet columns, each pallet assembly is arranged on a respective pallet column of the plurality of pallet columns, the plurality of the hole positioner columns are respectively arranged on both sides of the mounting platform, and the plurality of the pallet columns are arranged in a middle of the mounting platform; and each hole positioner column of the plurality of hole positioner columns comprises a first vertical tubular column, a first connecting plate, a first base and a mounting plate, wherein the mounting plate is connected to the first base by a connecting bolt, the first base is connected to the first vertical tubular column, an outer surface of the first vertical tubular column is connected to the first connecting plate, and the first connecting plate is provided with a plurality of standard mounting holes;

wherein each strut positioner assembly of the plurality of strut positioner assemblies comprises an abutting nut, a positioning sleeve, a strut, a cylindrical insert pin, an end insert pin and a T-shaped insert pin, both ends of the end insert pin are threaded rod structures, one end of the end insert pin is connected to one end of the strut, the cylindrical insert pin is configured to fix the end insert pin and the strut, the other end of the strut is sleeved into the positioning sleeve, and one end of the positioning sleeve is screwed to the abutting nut.

2. The self-positioning assembly system for rapid assembly of an aircraft according to claim 1, wherein a top of the first vertical tubular column is closed by a first hoisting plate, and the first hoisting plate is connected to a hoisting ring.

3. The self-positioning assembly system for rapid assembly of an aircraft according to claim 1, wherein each pallet column of the plurality of pallet columns comprises a second vertical tubular column, a second connecting plate, a second base and a mounting plate, wherein the mounting plate is connected to the second base by a connecting bolt, the second base is connected to the second vertical tubular column, an outer surface of the second vertical tubular column is connected with the second connecting plate, and the second connecting plate is provided with a plurality of standard mounting holes.

4. The self-positioning assembly system for rapid assembly of an aircraft according to claim 3, wherein a bottom of the second vertical tubular column is fixed with a plurality of second rib plates, and a bottom of each of the second rib plates is connected to the second base, a top of the second vertical tubular column is closed by a second hoisting plate, and a hoisting hole is opened in a center of the second hoisting plate.

5. The self-positioning assembly system for rapid assembly of an aircraft according to claim 1, wherein each hole positioner assembly of the plurality of hole positioner assemblies comprises a base plate, a slide rail support, a positioning pin assembly, a hole positioner or an intersection point hole positioner, the base plate is mounted on a respective hole positioner column of the plurality of hole positioner columns and/or a respective pallet column of the plurality of pallet columns, the slide rail support is connected to the base plate by the positioning pin assembly, and a tail end of the slide rail support is connected with the hole positioner and/or the intersection point hole positioner.

6. The self-positioning assembly system for rapid assembly of an aircraft according to claim 5, wherein the positioning pin assembly comprises an insert pin, a channel bushing, a cylindrical pin, and a bushing, the channel bushing has a spiral track groove in a spiral shape or a track groove in a Z shape, the channel bushing is fixed to the slide rail support, the bushing is fixed to the base plate, a lower part of the insert pin is connected to the bushing, and the cylindrical pin is arranged on the insert pin.

7. The self-positioning assembly system for rapid assembly of an aircraft according to claim 1, wherein each strut positioner assembly of the plurality of strut positioner assemblies comprises an abutting nut, a positioning sleeve, a pressing block insert pin, a locking nut, a strut, a cylindrical insert pin and an end insert pin, one end of the end insert pin is a polished rod and the other end of the end insert pin is a threaded rod, one side of the polished rod of the end insert pin is inserted into the strut, and the end insert pin and the strut are fixed by the cylindrical insert pin, the other end of the strut is sleeved in the positioning sleeve, the positioning sleeve is provided with wedge-shaped grooves on both sides along an axial direction, the wedge-shaped grooves are arranged along a length direction of the positioning sleeve, the pressing block insert pin is placed in the wedge-shaped groove, and the pressing block insert pin is connected to the locking nut.

8. The self-positioning assembly system for rapid assembly of an aircraft according to claim 7, wherein a pointer is provided on the pressing block insert pin, a scale is provided on an outer surface of the positioning sleeve, and the pointer is configured to indicate the scale.

9. The self-positioning assembly system for rapid assembly of an aircraft according to claim 1, wherein each pallet assembly of the plurality of pallet assemblies comprises a support, a pallet and a hole positioner, the support is connected to the pallet, an upper surface of the pallet supports aircraft parts, and the hole positioner is fixed to one side of the pallet and is configured to position a frame-shaped product of the aircraft.

10. The self-positioning assembly system for rapid assembly of an aircraft according to claim 1, wherein the mounting platform is also provided with a special positioning assembly for a rotating top support and/or parts tooling positioning assembly, the special positioning assembly for the rotating top support comprises a plurality of frameworks, a positioner support and a rotating top hole positioner, a bottom of each framework is connected to the mounting platform, a plurality of the frameworks are connected to each other by a cross rod, an upper part of each framework is connected to the positioner support, a top of the positioner support is connected to the rotating top hole positioner, and the special positioning assembly for the rotating top support is configured to perform multi-point positioning on circular parts of the aircraft.

11. The self-positioning assembly system for rapid assembly of an aircraft according to claim 10, wherein the parts tooling positioning assembly comprises a parts tooling body and a large-small head insert pin, the parts tooling body is provided with positioning holes at four corners, the large-small head insert pin are inserted into the positioning holes respectively and are connected to the holes to be positioned arranged on a parts product, and an annular gasket is sandwiched between the holes to be positioned or the positioning hole and the large-small head insert pin.

12. The self-positioning assembly system for rapid assembly of an aircraft according to claim 1, further comprising:
an intersection point hole positioner mounted on a respective hole positioner column of the plurality of hole positioner columns,
wherein the intersection point hole positioner comprises a mounting base, an intersection point hole positioning support, an intersection point hole insert pin, a positioning lug, and a compression nut, one side of the mounting base is connected to a tail end of the slide rail support, the other side of the mounting base is connected to the intersection point hole positioning support, a plurality of positioning lugs are inserted into the intersection point hole positioning support, the intersection point hole insert pin penetrates through the positioning lug, and one end of the intersection point hole insert pin is provided with the compression nut.

13. An assembly method based on a self-positioning assembly system for rapid assembly of an aircraft, applied to the self-positioning assembly system for rapid assembly of an aircraft according to claim 1, wherein the assembly method comprises:
step S0, analyzing an overall structural characteristics of the aircraft, stripping out key control points, and connecting a fuselage assembly fixture and a wing assembly fixture to the mounting platform according to positions of the mounting platform and the framework assembly corresponding to the key control points;

step S1, using the fuselage assembly fixture to perform self-positioning assembly for fuselage parts;

step S2, using the wing assembly fixture to perform self-positioning assembly for wing parts;

step S3, on the basis of the completion of step S1 and step S2, enabling the fuselage assembly fixture to match with wing attitude adjustment frame, and performing finish machining and reaming of wing body; and step S4, on the basis of the completion of step S3, performing self-positioning assembly for accessory parts of the aircraft, to form aircraft framework by final assembly, and performing skin riveting for the aircraft framework.

14. The assembly method based on a self-positioning assembly system for rapid assembly of an aircraft according to claim 13, wherein the step S0, analyzing the overall structural characteristics of the aircraft, the stripping out the key control points comprises:
1) The key control points are main load-bearing structures of the aircraft, and comprises a main frame, a fuselage sub-frame, a main beam, a key truss and a key rib that bear and disperse the flight load of the airplane body; or
2) the key control points are key coordination intersection points in aircraft assembly process, and comprises a connection coordination intersection point of the fuselage and the wing body, a coordination intersection point of a task load compartment, a coordination intersection point of the fuselage and a small airfoil and a joint assembly of the wing body; or
3) the key control points are important parts that affect flight safety, and comprises a nose landing gear shaft and a main landing gear shaft that affect the landing safety of the aircraft; or
4) the key control points are the structures of design separation surface and process separation surface.

15. The assembly method based on a self-positioning assembly system for rapid assembly of an aircraft according to claim 14, wherein the step S1 comprises steps S11 to S16:
step S11, hosting the main frame of the fuselage and placing the main frame of the fuselage on the fuselage assembly fixture, supporting a bottom of the main frame by the plurality of pallet assemblies and positioning the bottom of the main frame by the plurality of hole positioner assemblies, so that the slide rail support drives the hole positioner to slide to the position to be positioned, tightening the positioning threaded pin, locking the locking threaded pin; and using an intersection point hole positioner to perform intersection point hole positioning on the frame structure with the intersection point joint;

step S12, after completing the step S11, hoisting a secondary frame of the fuselage and placing the secondary frame of the fuselage on the plurality of pallet assemblies, and performing the self-positioning assembly on the secondary frame of the fuselage and the main frame of the fuselage by the plurality of strut positioner assemblies;

step S13, after completing the step S12, hoisting the main beam of the fuselage and placing the main beam of the fuselage on the fuselage assembly fixture, positioning the main beam of the fuselage by the hole positioner, and connecting and assembling the main beam of the fuselage with the main frame of the fuselage;

step S14, after completing the step S13, hoisting a rotating top and placing the rotating top on a special positioning assembly for a rotating top support, and a rotating top hole positioner performs hole positioning for the rotating top;

step S15, after completing the step S14, for non-frame parts of the fuselage that have relative position requirements, using parts tooling positioning assembly to perform positioning; and step S16, by using the main frame and the main beam that have been positioned by the parts tooling positioning assembly as positioning references, positioning and assembling through structural contours and self-positioning holes of the rest of aircraft part products.

16. The assembly method based on a self-positioning assembly system for rapid assembly of an aircraft according to claim 15, wherein the step S12 further comprises:

step S121, determining whether positioning length of each strut positioner assembly of the strut positioner assemblies meets the requirement of a preset length value, in response to that the positioning length of each strut positioner assembly of the strut positioner assemblies does not meet the requirement of the preset length value, proceeding to step S122, and in response to that the positioning length of the strut positioner assembly meets the requirement of the preset length value, proceeding to step S123;

wherein the strut positioner assembly comprises an abutting nut, a positioning sleeve, a pressing block insert pin, a locking nut, a strut, a cylindrical insert pin and an end insert pin;

step S122, enabling the strut to slide away and slide towards the positioning sleeve, stopping sliding in response to determining that the positioning length of the strut positioner assembly meets the requirement of the preset length value, and tightening the locking nut and the pressing block insert pin; and step S123, adjusting the abutting nut, so that the abutting nut is pressed against the main frame of the fuselage or a main beam wall of the fuselage.

17. The assembly method based on a self-positioning assembly system for rapid assembly of an aircraft according to claim 13, wherein the step S2 comprises steps S21 to S23:

step S21, hoisting the main beam of the wing and placing the main beam of the wing on the wing assembly fixture, and using the wing assembly fixture to assemble;

step S22, hoisting a main rib of the wing and placing the main rib of the wing on the wing assembly fixture, and assembling the main beam of the wing and the main rib of the wing; and step S23, for the connection coordination intersection point of the fuselage and the wing, using an intersection point hole positioner to perform intersection point hole positioning.

18. The assembly method based on a self-positioning assembly system for rapid assembly of an aircraft according to claim 13, further comprising:

step S5, after completing the step S4, when mounting a next model, if the next model is the same as the model that has been assembled, there is no need to disassemble the parts tooling positioning assembly for self-positioning assembly system, taking out current vertical aircraft from the parts tooling positioning assembly, adjusting various positioner assemblies, and mounting the next model; if the next model is different from the model that has been assembled, disassembling various positioner assemblies, then removing the framework assembly from the mounting platform, mounting the next model, and reconstructing the self-positioning assembly system, then returning to the step S0.

* * * * *